(12) United States Patent
Sambongi et al.

(10) Patent No.: US 11,917,292 B2
(45) Date of Patent: Feb. 27, 2024

(54) IMAGING DEVICE WITH PIXELS, READOUT UNIT, AND SIGNAL LINE

(71) Applicant: NIKON CORPORATION, Tokyo (JP)

(72) Inventors: Sinsuke Sambongi, Wako (JP); Akira Kinoshita, Yokohama (JP); Yuki Kita, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/122,310

(22) Filed: Mar. 16, 2023

(65) Prior Publication Data

US 2023/0217107 A1  Jul. 6, 2023

Related U.S. Application Data

(63) Continuation of application No. 17/261,979, filed as application No. PCT/JP2019/028478 on Jul. 19, 2019, now Pat. No. 11,641,519.

(30) Foreign Application Priority Data

Jul. 20, 2018  (JP) .................................. 2018-137274

(51) Int. Cl.
*H04N 23/67* (2023.01)
*G03B 13/36* (2021.01)
(Continued)

(52) U.S. Cl.
CPC ............. *H04N 23/67* (2023.01); *G03B 13/36* (2013.01); *G03B 17/14* (2013.01); *H04N 23/55* (2023.01);
(Continued)

(58) Field of Classification Search
CPC ...... H04N 23/67; H04N 23/55; H04N 23/675; H04N 25/42; H04N 25/704; H04N 23/672;
(Continued)

(56) References Cited

U.S. PATENT DOCUMENTS 11,641,519 B2 *  5/2023  Sambongi ............ H04N 23/672
                                                 348/302
2008/0291311 A1   11/2008  Kusaka
(Continued)

FOREIGN PATENT DOCUMENTS

JP   2009-130580 A   6/2009
JP   2016-076815 A   5/2016
(Continued)

OTHER PUBLICATIONS

Oct. 21, 2019 Written Opinion issued in International Patent Application No. PCT/JP2019/028478.
(Continued)

*Primary Examiner* — Gevell V Selby
(74) *Attorney, Agent, or Firm* — Oliff PLC

(57) ABSTRACT

A focus detection device includes: an imaging unit having a first and second pixel each of which receives light transmitted through an optical system and outputs signal used for focus detection, and a third pixel which receives light transmitted through the optical system and outputs signal used for image generation; an input unit to which information regarding the optical system is input; a selection unit that selects one of the first and second pixel based on the information to the input unit; a readout unit that reads out the signal from one of the first and second pixel based on a selection result at a timing different from reading out the signal from the third pixel to be read out; and a focus detection unit that performs the focus detection based on at least one of the signals of the first and second pixel read out by the readout unit.

22 Claims, 17 Drawing Sheets

(51) Int. Cl.
  *G03B 17/14* (2021.01)
  *H04N 23/55* (2023.01)
  *H04N 25/704* (2023.01)
  *H04N 25/42* (2023.01)

(52) U.S. Cl.
  CPC ........... *H04N 23/675* (2023.01); *H04N 25/42* (2023.01); *H04N 25/704* (2023.01)

(58) Field of Classification Search
  CPC ........ G03B 13/36; G03B 17/14; G03B 13/18; G03B 30/00; G02B 7/34
  See application file for complete search history.

(56) References Cited

U.S. PATENT DOCUMENTS

| | | |
|---|---|---|
| 2015/0117832 A1 | 4/2015 | Aoki et al. |
| 2017/0041563 A1 | 2/2017 | Suzuki |
| 2019/0349539 A1 | 11/2019 | Motonaga |
| 2020/0077032 A1 | 3/2020 | Hamano |

FOREIGN PATENT DOCUMENTS

| | | |
|---|---|---|
| JP | 2016-109938 A | 6/2016 |
| JP | 2017-034606 A | 2/2017 |
| JP | 2017-0216578 A | 12/2017 |
| WO | 2014/006783 A1 | 1/2014 |

OTHER PUBLICATIONS

Oct. 21, 2019 International Search Report issued in International Patent Application No. PCT/JP2019/028478.
Feb. 8, 2022 Office Action issued in Japanese Patent Application No. 2020-531390.
Jul. 7, 2022 Office Action issued in U.S. Appl. No. 17/261,979.
Dec. 20, 2022 Notice of Allowance issued in U.S. Appl. No. 17/261,979.
Nov. 22, 2022 Office Action issued in Japanese Application No. 2022-063262.

\* cited by examiner (a)

| POSITION ZONE OF FOCUSING LENS | Z1 | Z2 | ... | Zn |
|---|---|---|---|---|
| CONSTANT TERM Co | Poz1 | Poz2 | ... | Pozn |
| COEFFICIENT h4 | h4z1 | h4z2 | ... | h4zn |
| COEFFICIENT h2 | h2z1 | h2z2 | ... | h2zn |

FIG. 12

| ZONE | W1 | W2 | ... | Wn |
|---|---|---|---|---|
| CONSTANT TERM Co | Pow1 | Pow2 | ... | Pown |
| COEFFICIENT h4 | h4w1 | h4w2 | ... | h4wn |
| COEFFICIENT h2 | h2w1 | h2w2 | ... | h2wn |

IMAGING DEVICE WITH PIXELS, READOUT UNIT, AND SIGNAL LINE

RELATED APPLICATIONS

This application is a continuation application of U.S. patent application Ser. No. 17/261,979, filed Jan. 21, 2021, which claims priority to Japanese Patent Application No. 2018-137274, filed Jul. 20, 2018. The contents of those prior applications are incorporated herein by reference in their entireties.

TECHNICAL FIELD

The present invention relates to a focus detection device, an imaging device, and an interchangeable lens.

BACKGROUND ART

An image sensor that reads out a signal for focus detection and a signal for image generation is known (for example, Patent Literature 1: PTL1). In such an image sensor, it is desired to increase the speed of signal reading.

CITATION LIST

Patent Literature

PTL 1: Japanese Laid-Open Patent Publication No. 2017-34606

SUMMARY OF INVENTION

According to the 1st aspect of the present invention, a focus detection device comprises: an imaging unit having a first pixel and a second pixel each of which receives light transmitted through an optical system and outputs signal used for focus detection, and a third pixel which receives light transmitted through the optical system and outputs signal used for image generation; an input unit to which information regarding the optical system is input; a selection unit that selects at least one of the first pixel and the second pixel based on the information input to the input unit; a readout unit that reads out the signal from at least one of the first pixel and the second pixel based on a selection result of the selection unit at a timing different from a timing of reading out the signal from the third pixel to be read out; and a focus detection unit that performs the focus detection based on at least one of the signals of the first pixel and the second pixel read out by the readout unit.

According to the 2nd aspect of the present invention, an imaging device comprises: the focus detection device according to the 1st aspect, and a generation unit that generates image data based on signals output from at least one of the first pixel, the second pixel, and the third pixel.

According to the 3rd aspect of the present invention, an interchangeable lens comprises: a detachable portion that enables to attach and detach to the focus detection device according to the 1st aspect.

BRIEF DESCRIPTION OF DRAWINGS

FIG. 11 is a table showing a constant term and coefficients of a function that approximates representative optical characteristic curve in each focus position zone in the imaging device according to the first embodiment.

FIG. 12 is a table showing a constant term and coefficients of a function that approximates representative optical characteristic curve in each zone in the imaging device according to the first embodiment.

DESCRIPTION OF EMBODIMENTS

First Embodiment

Figure 1:
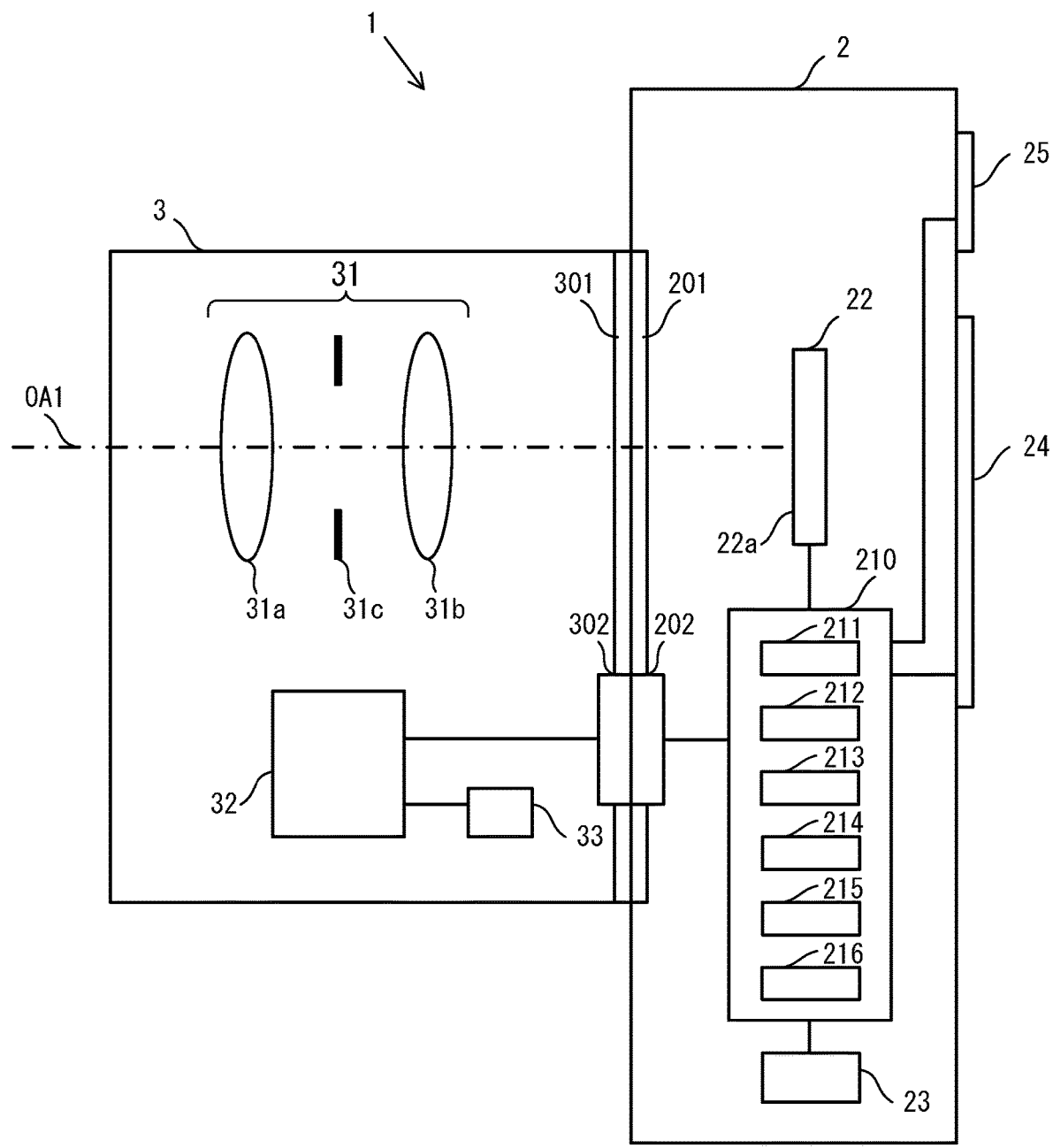
FIG. 1 is a diagram showing a configuration example of an imaging device according to the first embodiment.

FIG. 1 is a diagram showing a configuration example of an electronic camera 1 (hereinafter, referred to as a camera 1) which is an example of an imaging device according to the first embodiment. The camera 1 is configured with a camera body 2 and an interchangeable lens 3. Since the camera 1 is configured with the camera body 2 and the interchangeable lens 3, it is sometimes called a camera system.

The camera body 2 is provided with a body-side mount unit 201 to which the interchangeable lens 3 is to be attached. The interchangeable lens 3 is provided with a lens-side mount unit 301 that is to be attached to the camera body 2. The lens-side mount unit 301 and the body-side mount unit 201 are provided with a lens-side connection portion 302 and a body-side connection portion 202, respectively. The lens-side connection portion 302 and the body-side connection portion 202 are each provided with a plurality of terminals such as a terminal for a clock signal, a terminal for a data signal, and a terminal for supplying power. The interchangeable lens 3 is to be detachably attached to the camera body 2 by the lens-side mount unit 301 and the body-side mount unit 201.

Upon being attached the interchangeable lens 3 to the camera body 2, the terminal provided on the body-side connection portion 202 and the terminal provided on the lens-side connection portion 302 are electrically connected. Thereby, it becomes to be possible to supply power from the camera body 2 to the interchangeable lens 3 or to communicate between the camera body 2 and the interchangeable lens 3.

The interchangeable lens 3 includes a photographing optical system (imaging optical system) 31, a lens control unit 32, and a lens memory 33. The photographing optical system 31 includes, a plurality of lenses including a zoom lens (variable magnification lens) 31a for changing the focal length and a focusing lens (focus adjustment lens) 31b, and an aperture 31c, and forms a subject image on the imaging surface 22a of the image sensor 22. Although the zoom lens 31a and the focusing lens 31b are schematically shown in FIG. 1, a common photographing optical system is generally configured with a lot of optical elements.

Further, as will be described later, the photographing optical system 31 of the interchangeable lens 3 has an optical characteristic that the position of the exit pupil thereof, that is, the exit pupil distance changes depending on the image height. In other words, the exit pupil distance of the photographing optical system 31 changes depending on the position on the imaging surface 22a, that is, the distance from the optical axis OA1 of the photographing optical system 31 on the imaging surface 22a. The optical axis OA1 of the photographing optical system 31 intersects the imaging surface 22a at the center position of the imaging surface 22a. Here, the exit pupil distance is the distance between the exit pupil of the photographing optical system 31 and the image plane of the image by the photographing optical system 31. It is to be noted, the imaging surface 22a of the image sensor 22 is, for example, a surface on which a photoelectric conversion unit described later is arranged or a surface on which a microlenses are arranged.

Moreover, the photographing optical system 31 differs depending on the type of the interchangeable lens 3 to be mounted on the body-side mount unit 201. Therefore, the exit pupil distance of the photographing optical system 31 differs depending on the type of the interchangeable lens 3. Further, the optical characteristics in which the exit pupil distance changes depending on the image height, also differ depending on the type of the interchangeable lens 3.

The lens control unit 32 is configured with a processor such as a CPU, FPGA, and ASIC, and a memory such as ROM and RAM, and controls each part of the interchangeable lens 3 based on a control program. The lens control unit 32 controls the position of the zoom lens 31a, the position of the focusing lens 31b, and the drive of the aperture 31c based on the signal output from a body control unit 210 of the camera body 2. Upon being input a signal indicating moving direction, movement amount or the like of the focusing lens 31b from the body control unit 210, the lens control unit 32 moves the focusing lens 31b forward or backward in the optical axis OA1 direction based on the signal, to adjust the focal position of the photographing optical system 31. Further, the lens control unit 32 controls the position of the zoom lens 31a and/or the aperture diameter of the aperture 31c based on the signal output from the body control unit 210 of the camera body 2.

The lens memory 33 is configured with, for example, a non-volatile storage medium or the like. Information related to the interchangeable lens 3 is stored (recorded) as lens information in the lens memory 33. The lens information includes data on the optical characteristics (the exit pupil distance and/or an F number) of the photographing optical system 31, data on the infinity position and the closest position of the focusing lens 31b, and data on the shortest focal length and the longest focal length of the interchangeable lens 3. It is to be noted that the lens information differs depending on the type of the interchangeable lens 3. The lens information may be stored in the internal memory of the lens control unit 32. Further, the lens information may be stored in the body memory 23 in the camera body 2 described later. In this case, the body memory 23 stores the lens information of the plurality of types of interchangeable lenses 3.

In the present embodiment, the lens information includes information regarding the exit pupil distance of the photographing optical system 31. Although regarding the information with respect to the exit pupil distance will be described later, it includes the information indicating the exit pupil distance (Co) at the position where the imaging surface 22a and the optical axis OA1 intersect (the position where the image height is zero) and the information on coefficients (h4, h2) of the calculation formula showing the relationship between the exit pupil distance and the image height. The writing of data to the lens memory 33 and the reading of data from the lens memory 33 are controlled by the lens control unit 32. Upon being attached the interchangeable lens 3 to the camera body 2, the lens control unit 32 transmits the lens information to the body control unit 210 via the terminals of the lens-side connection portion 302 and the body-side connection portion 202. Further, the lens control unit 32 transmits position information (focal length information) of the zoom lens 31a being controlled, position information of the focusing lens 31b being controlled, information of the F number of the aperture 31c being controlled, and the like to the body control unit 210.

In the present embodiment, the lens control unit 32 functions as an output unit that transmits information regarding the exit pupil distance of the photographing optical system 31 to the camera body 2. The body control unit 210 functions as an input unit being input information, from the interchangeable lens 3, regarding the exit pupil distance of the photographing optical system 31.

The lens control unit 32 performs bidirectional communication between the camera body 2 and the interchangeable lens 3 via the terminals of the lens-side connection portion 302 and the body-side connection portion 202. Upon being input a signal requesting transmission of information (h4, h2, Co) regarding the exit pupil distance from the camera body 2, the lens control unit 32 transmits the information regarding the exit pupil distance to the camera body 2. It is to be noted that the information regarding the exit pupil distance differs depending on the type of the interchangeable lens 3. Further, the lens control unit 32 may transmit information regarding the exit pupil distance to the camera body 2 each time the image sensor 22 performs an image capturing. The lens control unit 32 may transmit information regarding the exit pupil distance to the camera body 2 in a case where the zoom lens 31a moves and the focal length of the photographing optical system 31 changes. The lens control unit 32 may transmit the information on the focal length of the photographing optical system 31 and the information on the exit pupil distance to the camera body 2 by one time bidirectional communication.

Next, the configuration of the camera body 2 will be described. The camera body 2 is provided with the image sensor 22, the body memory 23, a display unit 24, an operation unit 25, and the body control unit 210. The image sensor 22 is a CMOS image sensor, a CCD image sensor or the like. The image sensor 22 performs an image capturing of a subject image formed by the photographing optical system 31. In the image sensor 22, a plurality of pixels each having a photoelectric conversion unit are arranged in two-dimensional manner (row direction and column direction). The photoelectric conversion unit is configured with a photodiode (PD). The image sensor 22 performs photoelectric conversion of the received light by the photoelectric conversion unit to generate a signal, and outputs the generated signal to the body control unit 210.

As will be described later, the image sensor 22 has an imaging pixel that outputs a signal used for image generation and an AF pixel (a focus detection pixel) that outputs a signal used for focus detection. The imaging pixel includes a pixel (hereinafter, referred to as an R pixel) having a filter of a spectral characteristic that spectrally disperses the light having the first wavelength region (red (R) light) from the incident light, a pixel (hereinafter, referred to as a G pixel) having a filter of a spectral characteristic that spectrally disperses the light having the second wavelength region (green (G) light) from the incident light, and a pixel (hereinafter, referred to as a B pixel) having a filter of a spectral characteristic that spectrally disperses the light having the third wavelength region (blue (B) light) from the incident light. The R pixel, the G pixel, and the B pixel are arranged according to the Bayer arrangement. The AF pixels are arranged by replacing a part of the imaging pixels and are dispersedly arranged on substantially the entire surface of the imaging surface 22a of the image sensor 22. It is to be noted, in the following description, in a case the term "pixel" is simply used, it means either one or both of the imaging pixel and the AF pixel.

The body memory 23 is configured with, for example, a non-volatile storage medium or the like. In the body memory 23, an image data, a control program, and the like are recorded. The writing of data to the body memory 23 and the reading of data from the body memory 23 are controlled by the body control unit 210. The display unit 24 displays an image based on image data, an image showing a focus detection area (an AF area) such as an AF frame, information on photographing such as a shutter speed and the F number, a menu screen, and the like. The operation unit 25 includes various setting switches such as a release button, a power switch, and a switch for switching various modes, and outputs a signal corresponding to each operation to the body control unit 210. Further, the operation unit 25 is a setting unit capable of setting an arbitrary focus detection area among a plurality of focus detection areas, and a user can select the arbitrary focus detection area by operating the operation unit 25.

The body control unit 210 is configured with a processor such as a CPU, FPGA, and ASIC, and a memory such as ROM and RAM, and controls each part of the camera 1 based on a control program. The body control unit 210 includes an area setting unit 211, a distance calculation unit 212, a pixel selection unit 213, a readout unit 214, a focus detection unit 215, and an image data generation unit 216.

The area setting unit 211 sets (selects) at least one focus detection area 100 among the plurality of focus detection areas 100 provided on the imaging surface 22a of the image sensor 22 shown in FIG. 2(a). The plurality of AF frames displayed on the display unit 24 correspond to the plurality of focus detection areas 100 provided on the image sensor 22, respectively. The area setting unit 211 sets, among the plurality of AF frames displayed on the display unit 24, the focus detection area 100 corresponding to the AF frame selected by the user by operating the operation unit 25, or the focus detection area 100 which is selected by the camera 1 in automatically, as the area in which the focus detection is performed. As will be described later, the focus detection unit 215 detects the deviation amount (defocus amount) between the image by the photographing optical system 31 and the imaging surface 22a using a signal output from the AF pixel in the focus detection area 100 set by the area setting unit 211.

As shown schematically in FIG. 2(b), in the focus detection area 100, in addition to the imaging pixels, a plurality types of pair of the AF pixels (the AF pixel pairs) are arranged. In the present embodiment, a first AF pixel pair, a second AF pixel pair, and a third AF pixel pair are arranged. The first AF pixel pair, the second AF pixel pair, and the third AF pixel pair are arranged for accurately detecting the defocus amount at the exit pupil distance that differs depending on the image height or the type of interchangeable lens. One of the AF pixel among the AF pixel pair outputs a first signal Sig1, and the other of the AF pixel among the AF pixel pair outputs a second signal Sig2. The first AF pixel pair, the second AF pixel pair, and the third AF pixel pair will be described later.

As shown in FIG. 2(a), the plurality of focus detection areas 100 are arranged in two-dimensional directions (row direction and column direction), and the image height differs depending on arranged position. The small region 110a (see FIG. 2(b)) in the focus detection area 100a at the center part of the imaging surface 22a is located on the optical axis OA1 of the photographing optical system 31, and the image height H here is substantially zero. As the focus detection area 100 being away from the center (optical axis OA1 of the photographing optical system 31) of the imaging surface 22a, the image height H thereat increases. In other words, as the distance from the center of the imaging surface 22a to the focus detection area 100 increases, the image height H thereat increases. Therefore, in the row where the focus detection area 100a exists, the focus detection areas 100 farthest from the optical axis OA1 of the photographing optical system 31 (the image height H is the highest) are a focus detection areas 100b and 100c located at the left end (the end in the −X direction) and the right end (the end in the +X direction). The focus detection areas 100 at which the image height H is highest in the image sensor 22 are four focus detection areas 100 at the corners of the imaging surface 22a.

Since the focus detection area 100 has a predetermined area, the image height differs for each AF pixel depending on the position in the focus detection area 100. That is, within the focus detection area 100, the image height at the central small region 110a (see FIG. 2(b)) is different from the image heights at the small regions 110b and 110c located at the left end (end in the −X direction) and the right end (end in the +X direction) respectively (see FIG. 2(b)). However, in the present embodiment, the value of the image height H at the center position of one focus detection area 100 is used as the value representing the image height of the entire focus detection area 100. The image height of the focus detection area 100a in the center part of the imaging surface 22*a* is zero, and the image heights of the focus detection areas 100*b* and 100*c* are predetermined image heights H.

The distance calculation unit 212 calculates the exit pupil distance of the photographing optical system 31 at the image height H. The distance calculation unit 212 calculates the exit pupil distance Po (H) of the photographing optical system 31 at the image height H of the focus detection area 100 set by the area setting unit 211 by the following formula (1).

$$Po(H) = h4 \times H^4 + h2 \times H^2 + Co \quad (1)$$

Formula (1) is a calculation formula with the image height H as a variable, the parameter (h4) is the coefficient of the fourth-order term of the variable H, the parameter (h2) is the coefficient of the second-order term of the variable H, and the constant term Co is the exit pupil distance at the position where the image height is zero (the position of the optical axis OA1 on the imaging surface 22*a*). The parameters (h4), (h2), and the constant term Co are information on the exit pupil distances corresponding to different image heights, and are values determined by the optical characteristics of the photographing optical system 31. Information indicating the parameters (h4), (h2) and the constant term Co is transmitted from the interchangeable lens 3 to the camera body 2 as lens information. It is to be noted, the calculation formula (1) is stored in the internal memory of the body control unit 210.

Based on the image height H of the focus detection area 100 set by the area setting unit 211, the lens information (h4, h2, Co), and the calculation formula (1), the distance calculation unit 212 calculates the exit pupil distance Po (H) for the image height H of the focus detection area 100 having been set. It is to be noted that the calculation formula (1) may be stored in the internal memory of the lens control unit 32. The lens control unit 32 may transmit the calculation formula (1) to the camera body 2 as lens information together with the parameters (h4), (h2) and the constant term Co.

The pixel selection unit 213 selects at least one type of the AF pixel pair among a plurality of types of the AF pixel pairs provided in the image sensor 22. In the present embodiment, the pixel selection unit 213 selects any one type of three types of the AF pixel pairs (the first to third AF pixel pairs) arranged in the focus detection area 100 set by the area setting unit 211. As will be described later, the pixel selection unit 213 selects the AF pixel pair suitable for the exit pupil distance Po (H) calculated by the distance calculation unit 212 from among three types of the AF pixel pairs. In a case that a plurality of focus detection areas 100 are set by the area setting unit 211, the pixel selection unit 213 selects the same type of the AF pixel pair in each selected focus detection area 100.

The readout unit 214 reads out a signal from the image sensor 22. In a case displaying a through image (live view image) of the subject on the display unit 24 and/or in a case shooting a moving image, the readout unit 214 reads out a signal used for image generation and/or a signal used for focus detection from the image sensor 22 at a predetermined cycle. The readout unit 214 sequentially selects the pixels of the image sensor 22 in row units and reads out the signal from the selected pixel row, that is, by a so-called rolling shutter method.

The readout unit 214 can perform to read out in a first readout mode and in a second readout mode. In the first readout mode, the readout unit 214 sequentially selects a row of pixels (hereinafter referred to as AF pixel row) in which the AF pixels constituting the AF pixel pair selected by the pixel selection unit 213 are arranged and a row of pixels (hereinafter referred to as an imaging pixel row) in which the AF pixel is not arranged, and reads out a signal from each pixel. In the second readout mode, the readout unit 214 separately reads out signals from the AF pixel row and from the imaging pixel row.

For example, the readout unit 214 reads out in the first readout mode in a case continuously shooting still images or in a case shooting a high-resolution moving image (for example, 4K moving image shooting). The readout unit 214 reads out in the second readout mode in a case displaying a through image on the display unit 24 or in a case performing low-resolution moving image shooting (for example, Full HD moving image shooting). The first readout mode and the second readout mode will be described later.

The focus detection unit 215 performs focus detection processing necessary for automatic focus adjustment (AF) of the photographing optical system 31. The focus detection unit 215 detects the focus position (movement amount of the focusing lens 31*b* to the focusing position) for focusing (forming) the image formed by the photographing optical system 31 on the imaging surface 22*a*. The focus detection unit 215 calculates the defocus amount by the pupil division type phase difference detection method using the first and second signals Sig1 and Sig2 of the AF pixel pair read out by the readout unit 214.

The focus detection unit 215 calculates an image shift amount by performing correlation calculation with a first signal Sig1 generated by capturing an image formed of a first light flux passed through a first pupil region of the exit pupil of the photographing optical system 31 and a second signal Sig2 generated by capturing an image formed of a second light flux passed through a second pupil region of the exit pupil of the photographing optical system 31. The focus detection unit 215 converts the image shift amount into a defocus amount based on a predetermined conversion formula. The focus detection unit 215 calculates the movement amount of the focusing lens 31*b* to the in-focus position based on the calculated defocus amount.

The focus detection unit 215 determines whether or not the defocus amount is within the permissible value. If the defocus amount is within the permissible value, the focus detection unit 215 determines that being an in-focus state. On the other hand, if the defocus amount exceeds the permissible value, the focus detection unit 215 determines that not being in-focus state and transmits signal for instructing the movement amount and moving operation of the focusing lens 31*b* to the lens control unit 32 of the interchangeable lens 3. Focus adjustment is performed automatically by the lens control unit 32 moving the focusing lens 31*b* according to the movement amount.

Further, the focus detection unit 215 can also perform the focus detection processing by the contrast detection method in addition to the focus detection processing by the phase difference detection method. The body control unit 210 calculates the contrast evaluation value of the subject image one after another based on the signal output from the imaging pixels while moving the focusing lens 31*b* of the photographing optical system 31 along the optical axis OA1 direction. The body control unit 210 associates the position of the focusing lens 31*b* and the contrast evaluation value by using the position information of the focusing lens 31*b* transmitted from the interchangeable lens 3. Then, the body control unit 210 detects the position of the focusing lens 31*b* at which shows the peak value of the contrast evaluation value, that is, the maximum value, as the in-focus position.

The body control unit 210 transmits information on the position of the focusing lens 31b corresponding to the detected focusing position to the lens control unit 32. The lens control unit 32 moves the focusing lens 31b to the in-focus position to perform the focus adjustment.

The image data generation unit 216 generates image data by performing various image processing on the signals read out from the imaging pixels by the readout unit 214. It is to be noted that the image data generation unit 216 may generate image data also using signals output from the AF pixels.

Figure 3:
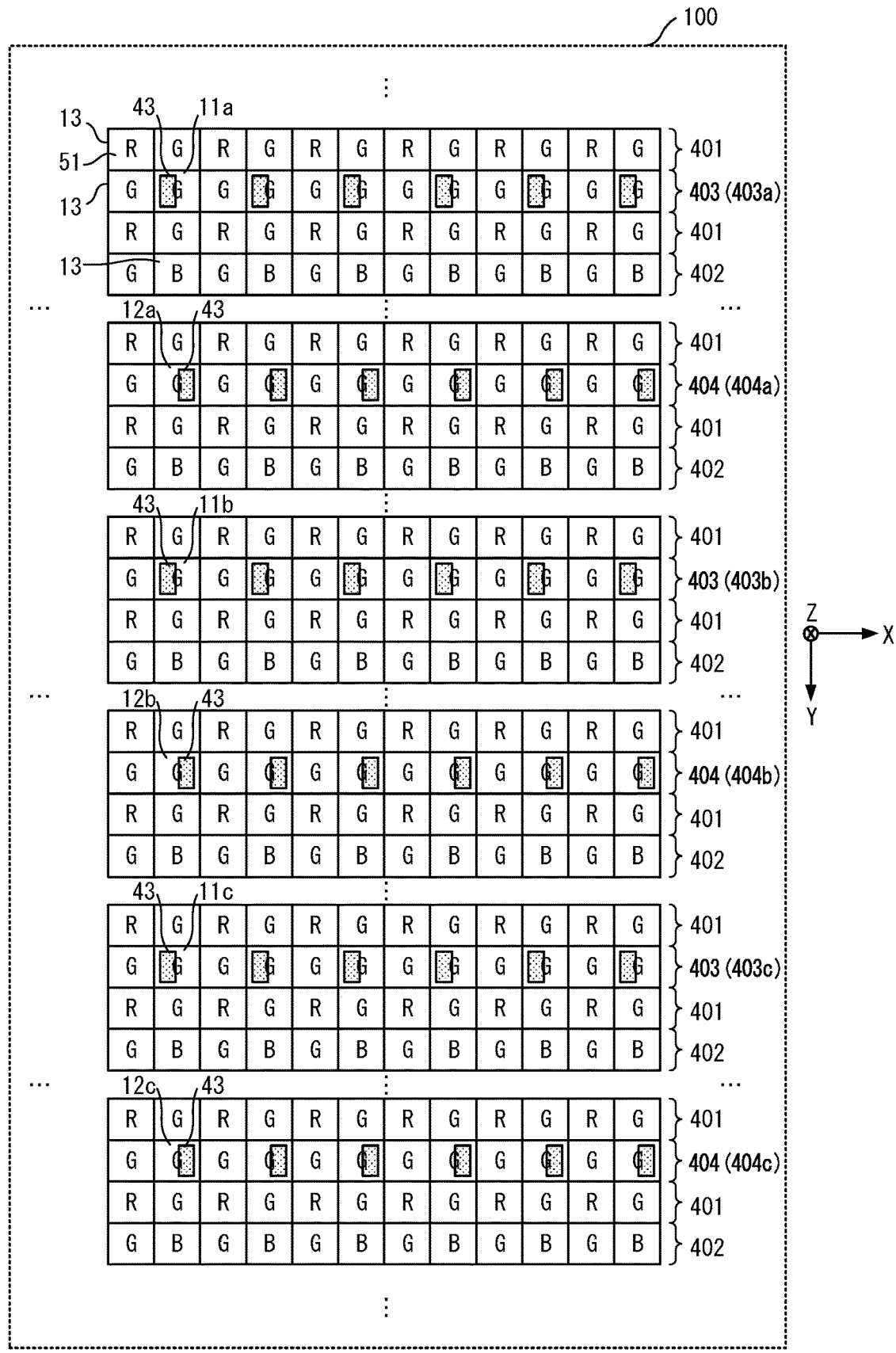
FIG. 3 is a diagram showing an arrangement example of pixels in the focus detection area of the imaging device according to the first embodiment.

FIG. 3 is a diagram showing an arrangement example of pixels in the focus detection area 100. The R pixel 13, the G pixel 13, and the B pixel 13 are arranged according to the Bayer arrangement. The first AF pixel 11 and the second AF pixel 12 are arranged by being replaced to a part of the imaging pixels 13 of the R, G, and B arranged in the Bayer arrangement. The first AF pixel 11 and the second AF pixel 12 each have a light-shielding portion 43. The position of the light-shielding portion 43 in the first AF pixel 11 is different from the position of the light-shielding portion 43 in the second AF pixel 12.

As shown in FIG. 3, the image sensor 22 has a pixel group (a first imaging pixel row) 401 in which the R pixels 13 and the G pixels 13 are alternately arranged in left-right direction, that is, the row direction, and a pixel group (a second imaging pixel row) 402 in which the G pixels 13 and the B pixels 13 are alternately arranged in the row direction. Further, the image sensor 22 has a pixel group (a first AF pixel row) 403 in which the G pixels 13 and the first AF pixels 11 are alternately arranged in the row direction, and a pixel group (a second AF pixel row) 404 in which the G pixels 13 and the second AF pixels 12 are alternately arranged in the row direction.

In a first AF pixel row 403a, the first AF pixels 11a and the G pixels 13 are alternately arranged. In a second AF pixel row 404a, which is separated from the first AF pixel row 403a with a predetermined number of rows, the second AF pixels 12a and the G pixels 13 are alternately arranged. It is to be noted, the arrangement position of the first AF pixel 11a in the first AF pixel row 403a and the arrangement position of the second AF pixel 12a in the second AF pixel row 404a are the same as each other. That is, the first AF pixel 11a and the second AF pixel 12a are arranged in the same column. The first AF pixel 11a of the first AF pixel row 403a and the second AF pixel 12a of the second AF pixel row 404a compose the first AF pixel pair.

In the first AF pixel row 403b, which is separated from the second AF pixel row 404a with a predetermined number of rows, the first AF pixels 11b and the G pixels 13 are alternately arranged. In the second AF pixel row 404b, which is separated from the first AF pixel row 403b with a predetermined number of rows, the second AF pixels 12b and the G pixels 13 are alternately arranged. It is to be noted, the arrangement position of the first AF pixel 11b in the first AF pixel row 403b and the arrangement position of the second AF pixel 12b in the second AF pixel row 404b are the same as each other. That is, the first AF pixel 11b and the second AF pixel 12b are arranged in the same column. The first AF pixel 11b of the first AF pixel row 403b and the second AF pixel 12b of the second AF pixel row 404b compose the second AF pixel pair.

In the first AF pixel row 403c, which is separated from the second AF pixel row 404b with a predetermined number of rows, the first AF pixels 11c and the G pixels 13 are alternately arranged. In the second AF pixel row 404c, which is separated from the first AF pixel row 403c with a predetermined number of rows, the second AF pixels 12c and the G pixels 13 are alternately arranged. It is to be noted, the arrangement position of the first AF pixel 11c in the first AF pixel row 403c and the arrangement position of the second AF pixel 12c in the second AF pixel row 404c are the same as each other. That is, the first AF pixel 11c and the second AF pixel 12c are arranged in the same column. The first AF pixel 11c of the first AF pixel row 403c and the second AF pixel 12c of the second AF pixel row 404c compose the third AF pixel pair.

It is to be noted, the first AF pixel row 403a and the second AF pixel row 404a may be arranged in a plurality of rows, respectively, and a plurality of the first AF pixel pairs may be arranged. Further, the first AF pixel row 403b and the second AF pixel row 404b may be arranged in a plurality of rows, respectively, and a plurality of the second AF pixel pairs may be arranged. The first AF pixel row 403c and the second AF pixel row 404c may be arranged in a plurality of rows, respectively, and a plurality of the third AF pixel pairs may be arranged.

As described above, the first, second and third AF pixel pairs are arranged so as to accurately detect defocus amount even if the exit pupil distance changes depending on an image height or a type of the interchangeable lens. Accordingly, except for in the pixel pairs arranged around the optical axis OA1 (the center of the imaging surface 22a) of the photographing optical system 31, areas of the light-shielding portions of the first, second and third AF pixel pairs are different to each other. Except for the AF pixels around the optical axis OA1 of the photographing optical system 31, the incident angles of the light incident on the AF pixels are different depending on the exit pupil distances being different. The incident angle increases as the exit pupil distance decreases, and the incident angle decreases as the exit pupil distance increases. The area of the light-shielding portion 43 differs depending on the AF pixel pair in order to block a part of the light incident at different incident angles depending on the exit pupil distance. Thereby, the focus detection unit 215 can accurately detect the defocus amount even if the exit pupil distance differs. It is to be noted, with respect to the pixel pair around the optical axis OA1 (center of the imaging surface 22a) of the photographing optical system 31, an incident angle is 0° in regardless of the exit pupil distance. Therefore, the areas of the light-shielding portions 43 of the first AF pixel pair, the second AF pixel pair, and the third AF pixel pair are the same. As will be described later, the area of the light-shielding portion 43 differs also depending on the position (image height) of the AF pixel.

Each of the first AF pixels 11a, 11b, 11c and the second AF pixels 12a, 12b, 12c is provided with a filter having spectral characteristics that spectrally disperses the second wavelength region (green (G)) of the incident light. It is to be noted, the filter being provided with each of the AF pixels of the first AF pixels 11a to 11c and the second AF pixels 12a to 12c may have spectral characteristics that spectrally disperses the first wavelength range (red (R) light) or the third wavelength range (blue (B) light). Alternatively, the first AF pixels 11a to 11c and the second AF pixels 12a to 12c may have filters having spectral characteristics that spectrally disperses the first, second, and third wavelength regions of the incident light.

Figure 4:
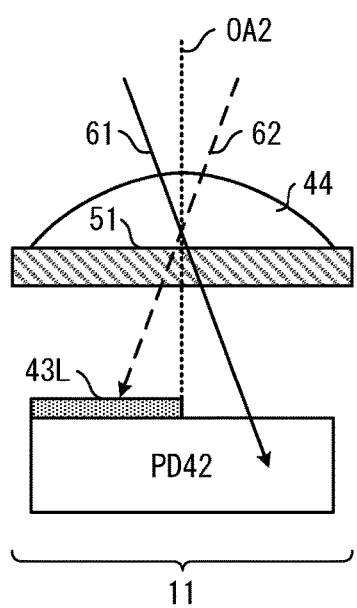
FIG. 4 is a diagram showing a s configuration example of pixels in the imaging device according to the first embodiment.
Figure 4:
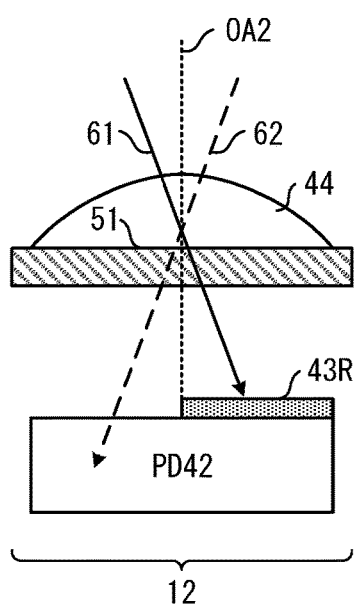
Figure 4:
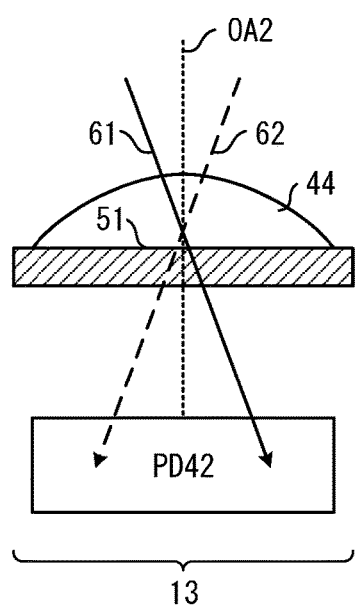
Figure 4:
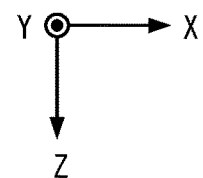

FIG. 4 is a diagram for explaining a configuration example of an AF pixel and an imaging pixel provided in the image sensor 22 according to the first embodiment. FIG. 4(a) shows an example of a cross section of the first AF pixel 11 among the first and second AF pixels 11 and 12 constituting the AF pixel pair. FIG. 4(b) shows an example of a cross section of the second AF pixel 12 among the first and second AF pixels 11 and 12 constituting the AF pixel pair. FIG. 4(c) shows an example of a cross section of the imaging pixel 13 (R pixel, G pixel, B pixel).

In FIG. 4, each of the first and second AF pixels 11 and 12 and the imaging pixel 13 includes a microlens 44, a color filter 51, and a photoelectric conversion unit 42 (PD42) which photoelectrically converts the light transmitted (passed) through the microlens 44 and the color filter 51. The first light flux 61 is a light flux that has passed through the first pupil region of the exit pupil of the photographing optical system 31 among divided in substantially two equal regions. The second light flux 62 is a light flux that has passed through the second pupil region of the exit pupil of the photographing optical system 31 among divided in substantially two equal regions.

In FIG. 4(a), the first AF pixel 11 is provided with a light-shielding portion 43L that blocks the second light flux 62 among the first and second light fluxes 61 and 62. The light-shielding portion 43L is provided, between the color filter 51 and the photoelectric conversion unit 42 and so as to position above the photoelectric conversion unit 42. In the example shown in FIG. 4(a), the light-shielding portion 43L is arranged so as to block the left half (−X direction side) of the photoelectric conversion unit 42. The right end (end in the +X direction) of the light-shielding portion 43L substantially coincides with the center line that bisects the photoelectric conversion portion 42 to the left and right. The photoelectric conversion unit 42 of the first AF pixel 11 receives the first light flux 61. The photoelectric conversion unit 42 of the first AF pixel 11 photoelectrically converts the first light flux 61 to generate an electric charge, and the first AF pixel 11 outputs signal Sig1 based on the electric charge generated by the photoelectric conversion unit 42.

The area of the light-shielding portion 43L differs depending on the position (image height) of the first AF pixel 11, except for the first AF pixel 11 around the optical axis OA1 (center of the imaging surface 22a) of the photographing optical system 31. If the position of the first AF pixel 11 differs, that is, the image height differs, the incident angle of the light incident to the first AF pixel 11 differs. If the image height increases, the incident angle increases, if the image height decrease, the incident angle decreases, and if the image height is 0, the incident angle is 0°. The area of the light-shielding portion 43L differs depending on the image height in order to block the second light flux 62 of the light incident at the incident angle that differs depending on the image height.

In FIG. 4(b), the second AF pixel 12 is provided with a light-shielding portion 43R that blocks the first light flux 61 among the first and second light fluxes 61 and 62. The light-shielding portion 43R is provided, between the color filter 51 and the photoelectric conversion unit 42 and so as to position above the photoelectric conversion unit 42. In the example shown in FIG. 4(b), the light-shielding portion 43R is arranged so as to block the right half (+X direction side) of the photoelectric conversion unit 42. The left end (end in the −X direction) of the light-shielding portion 43R substantially coincides with the center line that bisects the photoelectric conversion portion 42 to the left and right. The photoelectric conversion unit 42 of the second AF pixel 12 receives the second light flux 62. The photoelectric conversion unit 42 of the second AF pixel 12 photoelectrically converts the second light flux 62 to generate an electric charge, and the second AF pixel 12 outputs signal Sig2 based on the electric charge generated by the photoelectric conversion unit 42.

Similarly to that of the first AF pixel 11, the area of the light-shielding portion 43R differs depending on the position (image height) of the second AF pixel 12, except for the second AF pixel 12 around the optical axis OA1 (center of the imaging surface 22a) of the photographing optical system 31. The area of the light-shielding portion 43R differs depending on the image height in order to block the first light flux 61 of the light incident at the incident angle that differs depending on the image height.

FIG. 4(c) shows that the photoelectric conversion unit 42 of the imaging pixel 13 receives the first and second light fluxes 61 and 62 that have passed through the first and second pupil regions of the exit pupil of the photographing optical system 31. The photoelectric conversion unit 42 of the imaging pixel 13 photoelectrically converts the first and second light fluxes 61 and 62 to generate an electric charge, and the imaging pixel 13 outputs signal based on the electric charge generated by the photoelectric conversion unit 42.

Figure 5:
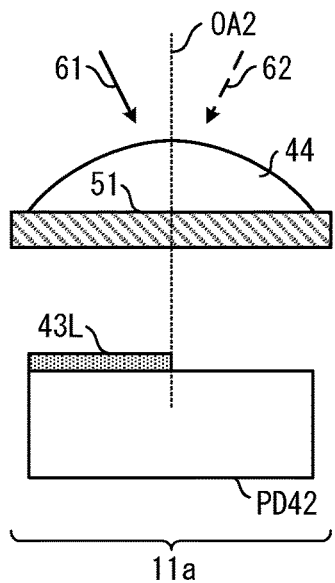
FIG. 5 is a cross-sectional view showing three types of AF pixel pairs to be arranged at the central region of the imaging device according to the first embodiment.
Figure 5:
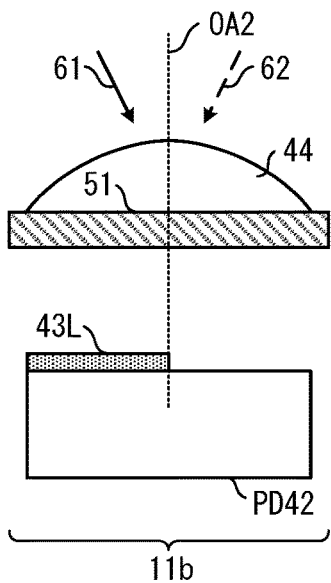
Figure 5:
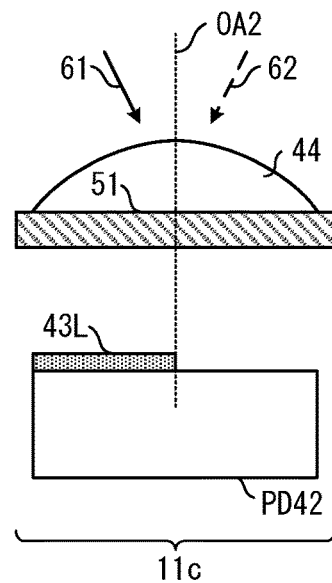
Figure 5:
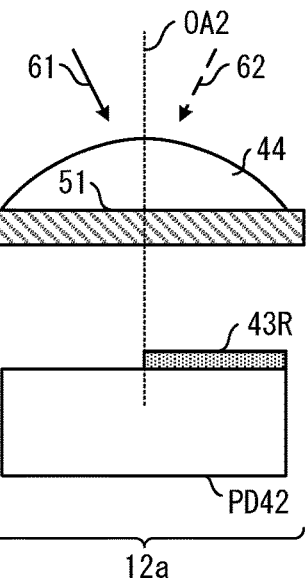
Figure 5:
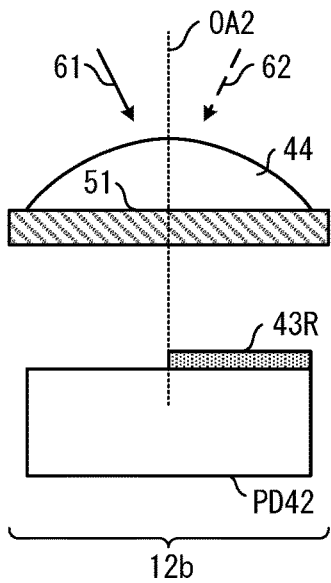
Figure 5:
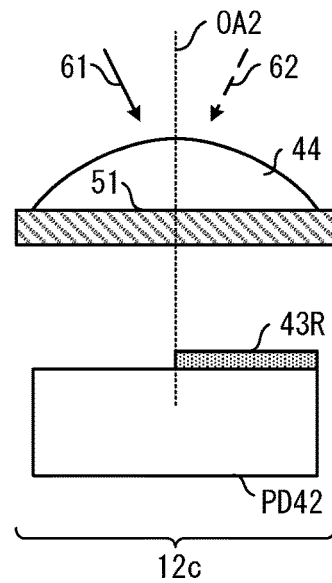

FIG. 5 is a cross-sectional view of three types of AF pixel pairs arranged in a small region 110a (see FIG. 2(b)) within the focus detection area 100a. FIG. 5(a) shows the first and second AF pixels 11a and 12a constituting the first AF pixel pair arranged in the first AF pixel row 403a and the second AF pixel row 404a of FIG. 3, respectively. FIG. 5(b) shows the first and second AF pixels 11b and 12b constituting the second AF pixel pair arranged in the first AF pixel row 403b and the second AF pixel row 404b of FIG. 3, respectively. FIG. 5(c) shows the first and second AF pixels 11c and 12c constituting the third AF pixel pair arranged in the first AF pixel row 403c and the second AF pixel row 404c of FIG. 3, respectively. As shown in FIG. 5, in each of the first AF pixels 11a to 11c and the second AF pixels 12a to 12c, the center line of the photoelectric conversion unit 42 and the optical axis OA2 of the microlens 44 substantially coincide. Light incident at an incident angle of 0° with respect to the optical axis OA2 of the microlens 44 is focused on the optical axis OA2 of the microlens. Since the line passing through the center of the photoelectric conversion unit 42 coincides with the optical axis OA2 of the microlens 44, the light incident on the microlens 44 is focused on the line passing through the center of the photoelectric conversion unit 42. That is, the light transmitted through the photographing optical system 31 is focused on a line passing through the center of the photoelectric conversion unit 42.

In the first AF pixel 11a shown in FIG. 5(a), the right end (end in the +X direction) of the light-shielding portion 43L substantially coincides with the optical axis OA2 of the microlens 44. The light-shielding portion 43L of the first AF pixel 11a shields the left half (−X direction side) of the photoelectric conversion unit 42. The second light flux 62 transmitted through the microlens 44 is shielded by the light-shielding portion 43L without being incident on the photoelectric conversion unit 42. Thereby, the photoelectric conversion unit 42 of the first AF pixel 11a receives the first light flux 61. In the second AF pixel 12a, the left end (end in the −X direction) of the light-shielding portion 43R substantially coincides with the optical axis OA2 of the microlens 44. The first light flux 61 transmitted through the microlens 44 is shielded by the light-shielding portion 43R without being incident on the photoelectric conversion unit 42. Thereby, the photoelectric conversion unit 42 of the second AF pixel 12a receives the second light flux 62.

In each of the first AF pixels 11b and 11c shown in FIG. 5(b) and FIG. 5(c), the right end (end in the +X direction) of the light-shielding portion 43L substantially coincides with the optical axis OA2 of the microlens 44. Therefore, each photoelectric conversion unit 42 of the first AF pixels 11b and 11c, similarly to that of the first AF pixel 11a, receives the first light flux 61. Further, in each of the second AF pixels 12b and 12c, the left end (end in the −X direction) of the light shielding portion 43R substantially coincides with the optical axis OA2 of the microlens 44. Therefore, similarly to the first AF pixel 12a, each photoelectric conversion unit 42 of the second AF pixels 12b and 12c receives the second light flux 62.

Figure 6:
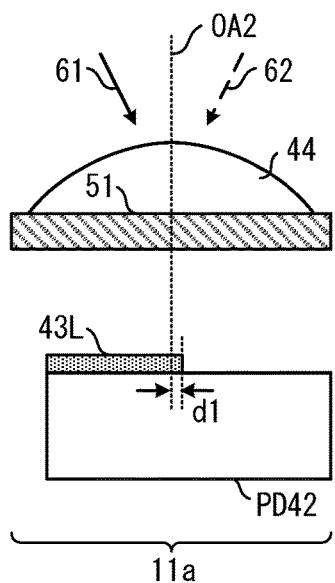
FIG. 6 is a cross-sectional view showing three types of AF pixel pairs to be arranged at a region corresponding to a predetermined image height in the imaging device according to the first embodiment.
Figure 6:
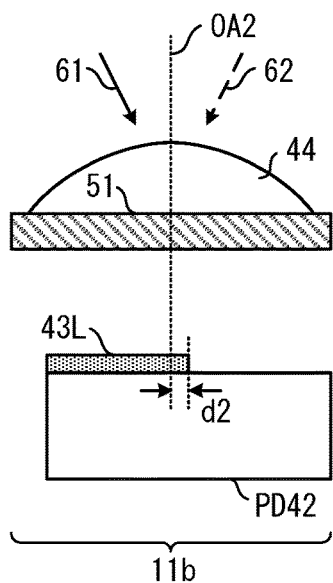
Figure 6:
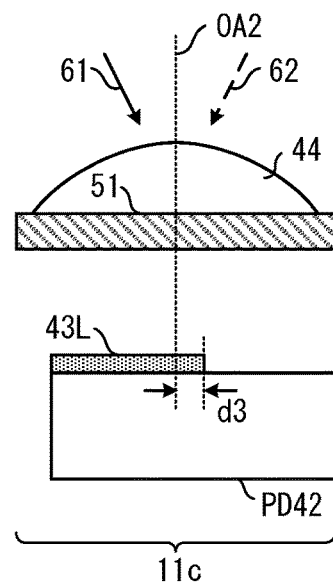
Figure 6:
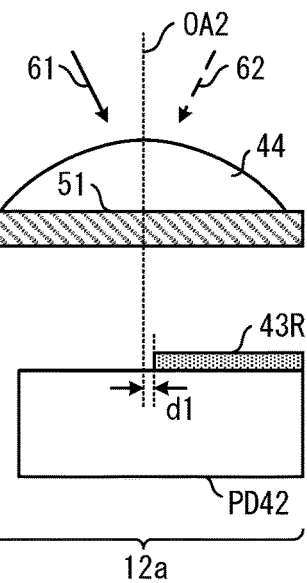
Figure 6:
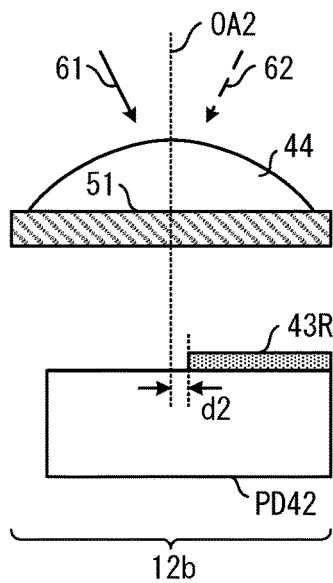
Figure 6:
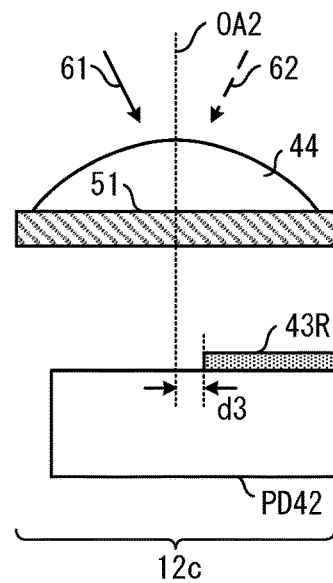

FIG. 6 is a cross-sectional view of three types of AF pixel pairs arranged in a small region 110c (see FIG. 2(b)) separated from the small region 110a in the focus detection area 100a in the +X direction. FIG. 6(a) shows the first and second AF pixels 11a and 12a constituting the first AF pixel pair. FIG. 6(b) shows the first and second AF pixels 11b and 12b constituting the second AF pixel pair. FIG. 6(c) shows the first and second AF pixels 11c and 12c constituting the third AF pixel pair.

As shown in FIG. 6, in each of the first AF pixels 11a to 11c and the second AF pixels 12a to 12c, a line passing through the center of the photoelectric conversion unit 42 is being shifted in the +X direction with respect to the optical axis OA2 of the microlens 44. In the present embodiment, in the first and second AF pixels arranged apart from the small region 110a in the +X direction, the line passing through the center of the photoelectric conversion unit 42 is being shifted in the +X direction with respect to the optical axis OA2 of the microlens 44. Further, in the first and second AF pixels arranged apart from the small region 110a in the −X direction, the line passing through the center of the photoelectric conversion unit 42 is being shifted in the −X direction with respect to the optical axis OA2 of the microlens 44.

As shown in FIG. 6, the areas of the light-shielding portions 43L of the first AF pixels 11a to 11c are different to each other. The area of the light-shielding portion 43L of the first AF pixel 11a is smaller than the area of the light-shielding portion 43L of the first AF pixel 11b. The area of the light-shielding portion 43L of the first AF pixel 11b is smaller than the area of the light-shielding portion 43L of the first AF pixel 11c. The areas of the light-shielding portions 43R of the second AF pixels 12a to 12c are different to each other. The area of the light-shielding portion 43R of the second AF pixel 12a is larger than the area of the light-shielding portion 43R of the second AF pixel 12b. The area of the light-shielding portion 43R of the second AF pixel 12b is larger than the area of the light-shielding portion 43R of the second AF pixel 12c.

As shown in FIG. 6, the line passing through the center line of the photoelectric conversion unit 42 and the optical axis OA2 of the microlens 44 are deviated, and the area of the light-shielding portions 43 of the first AF pixel and the area of the light-shielding portions 43 of the second AF pixel are different. Thus, in each of the first and second AF pixels, the edge of the light-shielding portion and the optical axis OA2 of the microlens 44 are deviated from each other. In FIG. 6(a), for example, in the first AF pixel 11a, the right end (end in the +X direction) of the light-shielding portion 43L is located on the +X direction side by the deviation amount d1 from the optical axis OA2 of the microlens 44. Further, in the second AF pixel 12a, the left end (end in the −X direction) of the light-shielding portion 43R is located on the +X direction side by the deviation amount d1 from the optical axis OA2 of the microlens 44.

As shown in FIG. 6, each of the deviation amounts in the second and third AF pixel pairs is different from the deviation amount in the first AF pixel pair. The deviation amount d2 in the first and second AF pixels 11b and 12b constituting the second AF pixel pair is larger than the deviation amount d1 in the first and second AF pixels 11a and 12a constituting the first AF pixel pair. The deviation amount d3 in the first and second AF pixels 11c and 12c constituting the third AF pixel pair is larger than the deviation amount d2 in the first and second AF pixels 11b and 12b constituting the second AF pixel pair. That is, d1<d2<d3.

Figure 2:
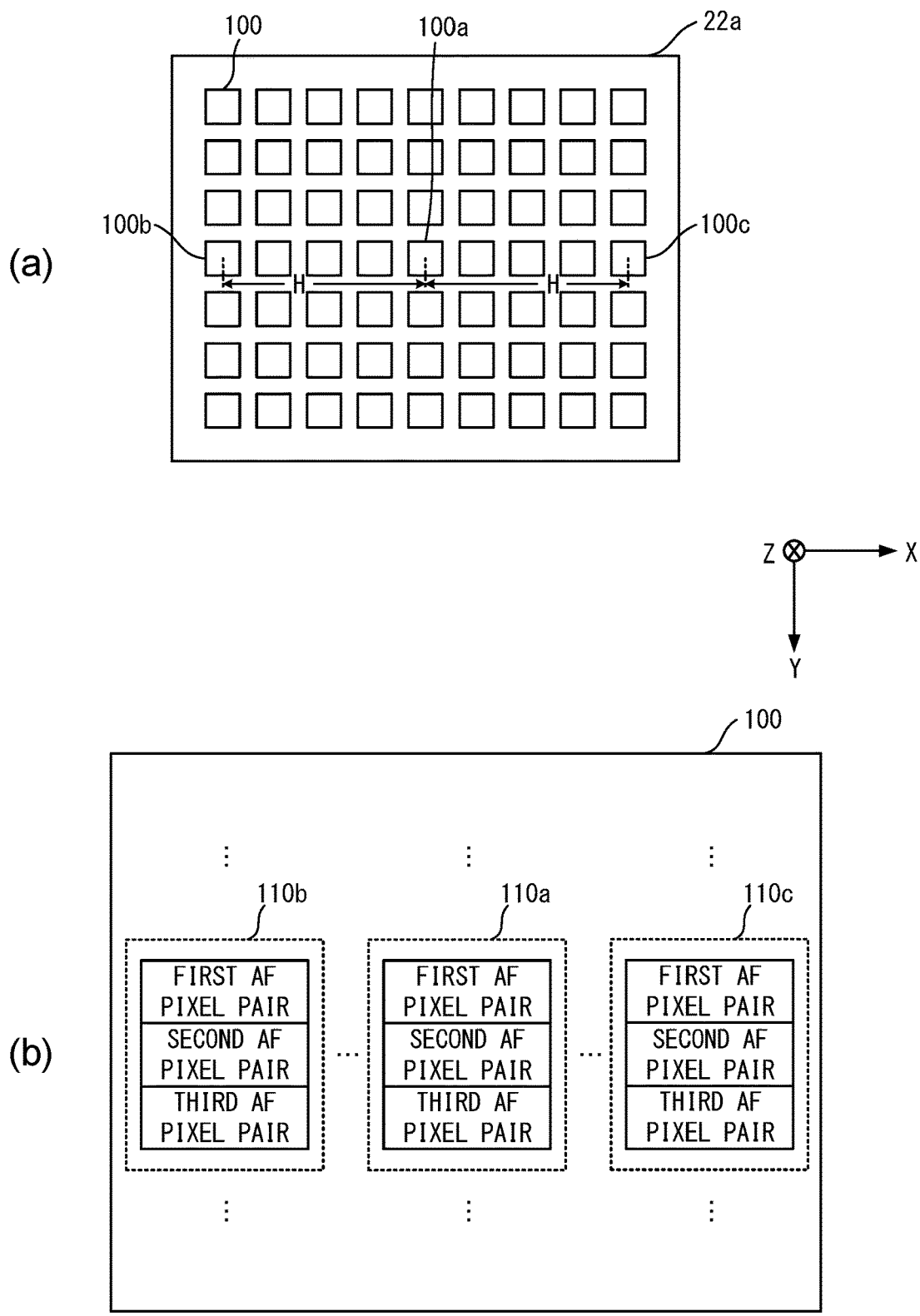
FIG. 2 is a diagram showing a focus detection area of an imaging surface of the imaging device according to the first embodiment.
Figure 7:
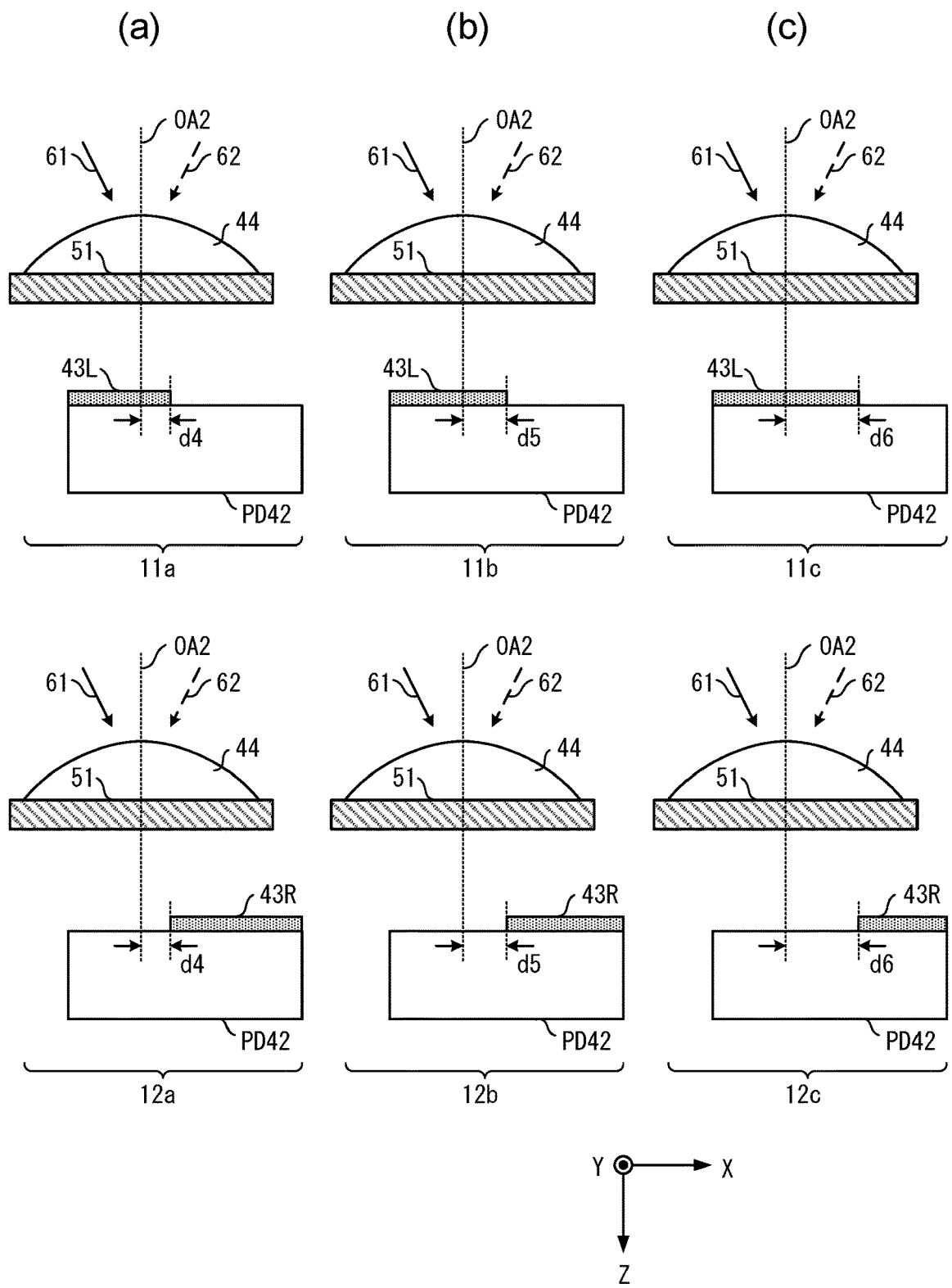
FIG. 7 is a cross-sectional view showing three types of AF pixel pairs to be arranged at a region corresponding to a predetermined image height in the imaging device according to the first embodiment.

FIG. 7 is a cross-sectional view of three types of AF pixel pairs in a part of the focus detection area 100c separated from the focus detection region 100a shown in FIG. 2 in the +X direction. FIG. 7(a) shows the first and second AF pixels 11a and 12a constituting the first AF pixel pair. FIG. 7(b) shows the first and second AF pixels 11b and 12b constituting the second AF pixel pair. FIG. 7(c) shows the first and second AF pixels 11c and 12c constituting the third AF pixel pair.

Similarly to the three types of AF pixel pairs shown in FIG. 6, in each of the first AF pixels 11a to 11c and the second AF pixels 12a to 12c shown in FIG. 7, a line passing through the center of the photoelectric conversion unit 42 is being shifted in the +X direction with respect to the optical axis OA2 of the microlens 44. Further, similarly to the three types of AF pixel pairs shown in FIG. 6, the areas of the light-shielding portions 43L of the first AF pixels 11a to 11c are different to each other. Also, the areas of the light-shielding portions 43R of the second AF pixels 12a to 12c are different to each other.

In the three types of AF pixel pairs shown in FIG. 6 and FIG. 7, each of the amounts of deviation of the line passing through the center of the photoelectric conversion unit 42 with respect to the optical axis OA2 of the microlens 44 differs to each other. Further, in the AF pixels other than the first AF pixel 11b and the second AF pixel 12b, the area of the light-shielding portion 43L and the area of the light-shielding portion 43R are different. Compared with the three types of AF pixel pairs shown in FIG. 6, the three types of AF pixel pairs shown in FIG. 7 have a larger deviation amount with respect to the optical axis OA2 of the microlens 44. Further, as compared with the first AF pixel 11a and the second AF pixel 12a shown in FIG. 6, the first AF pixel 11a and the second AF pixel 12a shown in FIG. 7 respectively have a smaller area of the light-shielding portion 43L and a larger area of the light-shielding portion 43R. As compared with the first AF pixel 11c and the second AF pixel 12c shown in FIG. 6, the first AF pixel 11c and the second AF pixel 12c shown in FIG. 7 respectively have a larger area of the light-shielding portion 43L and a smaller area of the light-shielding portion 43R. The areas of the light-shielding portion 43L and the light-shielding portion 43R in each of the first AF pixel 11b and the second AF pixel 12b shown in FIG. 7 are the same as the areas of those shown in FIG. 6.

In the first AF pixel 11a, the right end (end in the +X direction) of the light-shielding portion 43L is deviated by the amount d4 in the +X direction with respect to the optical axis OA2 of the microlens 44. In the second AF pixel 12a, the left end (end in the −X direction) of the light-shielding portion 43R is deviated by the amount d4 in the +X direction with respect to the optical axis OA2 of the microlens 44.

Each of the deviation amounts in the second and third AF pixel pairs is different from the deviation amount in the first AF pixel pair. The deviation amount d5 in the first and second AF pixels 11b and 12b constituting the second AF pixel pair is larger than the deviation amount d4 in the first and second AF pixels 11a and 12a constituting the first AF pixel pair. The deviation amount d6 in the first and second AF pixels 11c and 12c constituting the third AF pixel pair is larger than the deviation amount d5 in the first and second AF pixels 11b and 12b constituting the second AF pixel pair. That is, d4<d5<d6.

As shown in FIG. 5, FIG. 6 and FIG. 7, the deviation amount between the line passing through the center of the photoelectric conversion unit 42 and the optical axis OA2 of the microlens 44 differs depending on the image height. The higher the image height, the larger the deviation amount, and the lower the image height, the smaller the deviation amount. At a position where the image height is high, light passes through the photographing optical system 31 and is obliquely incident to the microlens 44. That is, the light is incident at an incident angle larger than 0° with respect to the optical axis OA2 of the microlens 44. Therefore, it can also be said that the larger the incident angle of light with respect to the microlens 44, the larger the deviation amount. Incident light having an incident angle larger than 0° with respect to the optical axis OA2 of the microlens 44 is focused as shifting in the +X direction or −X direction from the optical axis OA2 of the microlens. Because the line passing through the center of the photoelectric conversion unit 42 and the optical axis OA2 of the microlens 44 deviate from each other, the light incident on the microlens 44 is focused on the line passing through the center of the photoelectric conversion unit 42. That is, the light transmitted through the photographing optical system 31 is focused on a line passing through the center of the photoelectric conversion unit 42. Thereby, the amount of light transmitted through the photographing optical system 31 and incident on the photoelectric conversion unit 42 can be increased.

As shown in FIG. 5, FIG. 6 and FIG. 7, the area of the light-shielding portion 43 differs depending on the AF pixel pair. As described above, the exit pupil distance of the photographing optical system 31 differs depending on the type of the interchangeable lens 3. Therefore, each of the first AF pixel pair, the second AF pixel pair, and the third AF pixel pair has a light-shielding portion 43 having a different area in order to accurately detect the defocus amount at different exit pupil distances. Further, the area of the light-shielding portion 43L and the area of the light-shielding portion 43R of the first AF pixel pair differ depending on the position (image height) where the first AF pixel pair is arranged. As described above, the exit pupil distance of the photographing optical system 31 differs depending on the image height. Therefore, the first AF pixel pair has a light-shielding portion 43L and a light-shielding portion 43R having an area that differs depending on the image height in order to accurately detect the defocus amount at different exit pupil distances. The same applies to the third AF pixel pair as in the first AF pixel pair. Thereby, the focus detection unit 215 can accurately detect the defocus amount even at different exit pupil distances. That is, the focus detection unit 215 can accurately detect the defocus amount even if the image height or the type of the interchangeable lens changes.

In the first to third AF pixel pairs, the deviation amount between the light-shielding portion 43 and the optical axis of the microlens 44 increases as the image height increases in the +X direction from the small region 110a shown in FIG. 2(b). Comparing the deviation amounts of the first to third AF pixel pairs in the three regions where the image heights are Ha, Hb, and Hc (Ha<Hb<Hc) is as follows. The deviation amount in the first AF pixel pair at the region of image height Hb is larger than the deviation amount in the first AF pixel pair at the region of image height Ha, and is smaller than the deviation amount in the first AF pixel pair at the region of image height Hc. Similarly, the deviation amount in each the second and third AF pixel pairs at the region of image height Hb is respectively larger than the deviation amount in each the second and third AF pixel pairs at the region of image height Ha, and is respectively smaller than the deviation amount in each the second and third AF pixel pairs at the region of image height Hc. The deviation amount d4 in the first AF pixel pair arranged in the focus detection area 100c shown in FIG. 7 is larger than the deviation amount d1 in the first AF pixel pair arranged in the small region 110c shown in FIG. 6. The deviation amounts d5 and d6 in the second and third AF pixel pairs arranged in the focus detection region 100c shown in FIG. 7 are respectively larger than the deviation amounts d2 and d3 in the second and third AF pixel pairs arranged in the small region 110c shown in FIG. 6.

To the first to third AF pixel pairs arranged in the small region 110b separated from the small region 110a shown in FIG. 2(b) in the −X direction, deviation amounts of the same amount as d1 to d3 are respectively given in the direction opposite to the deviation direction shown in FIG. 6. To the first to third AF pixel pairs arranged in the small region 110b shown in FIG. 2(a), deviation amounts of the same amount as d4 to d6 are respectively given in the direction opposite to the deviation direction shown in FIG. 7. The deviation amount in the first to third AF pixel pairs arranged apart from the small region 110a in the −X direction also increases as the image height increases.

As described above, the deviation amounts in the first to third AF pixel pairs are different from each other. Therefore, on the surfaces intersecting in the light incident direction, the areas of light receiving portions of the photoelectric conversion units 42 in each of the first AF pixels 11a to 11c are different from each other, and the areas of light receiving portions of the photoelectric conversion units 42 in each of the second AF pixels 12a to 12c are different from each other. As described above, in the present embodiment, since the light receiving areas of the photoelectric conversion units 42 are different from each other in the first to third AF pixel pairs, it is possible to perform pupil division corresponding to different incident angles. As a result, the focus detection unit 215 can accurately detect the defocus amount.

Figure 8:
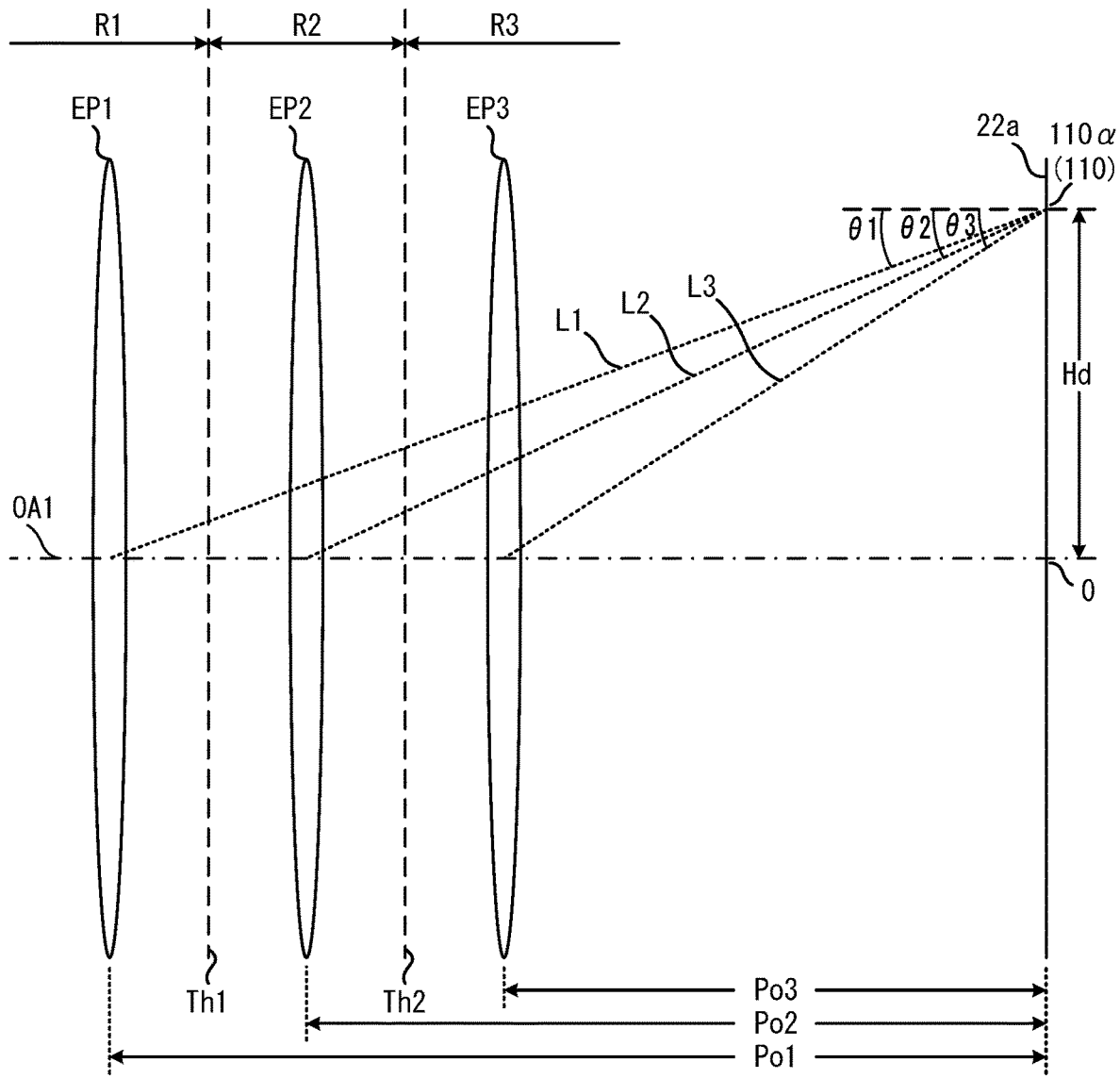
FIG. 8 is a diagram showing the relationship between the reference exit pupil and the image height in the imaging device according to the first embodiment.
Figure 8:
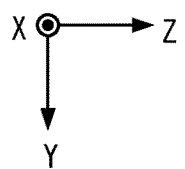

Next, an example of a method for determining the deviation amounts in the first to third AF pixel pairs in the focus detection area 100 will be described. In FIG. 8, 110a represents the position of the small region 110 located at a distance corresponding to the image height Hd from the position 0 (the center position of the imaging surface 22a) where the optical axis OA1 of the photographing optical system 31 intersects the imaging surface 22a of the image sensor 22. A first reference exit pupil EP1, a second reference exit pupil EP2, and a third reference exit pupil EP3 are set on the optical axis OA1 of the photographing optical system 31. The second reference exit pupil EP2 exists closer to the imaging surface 22a than the first reference exit pupil EP1 and exists to the +Z direction side than the first reference exit pupil EP1. The third reference exit pupil EP3 exists closer to the imaging surface 22a than the second reference exit pupil EP2 and exists to the +Z direction side than the second reference exit pupil EP2.

The distance between the first reference exit pupil EP1 and the imaging surface 22a is defined as the first reference exit pupil distance Po1, the distance between the second reference exit pupil EP2 and the imaging surface 22a is defined as the second reference exit pupil distance Po2, and the distance between the third reference exit pupil EP3 and the imaging surface 22a is defined as the third reference exit pupil distance Po3. It is to be noted that Po1>Po2>Po3.

In FIG. 8, L1 indicates the principal ray of the light flux that passes through the first reference exit pupil EP1 and is incident on the AF pixel in the small region 110 at the position 110α. L2 indicates the principal ray of the light flux that passes through the second reference exit pupil EP2 and is incident on the AF pixel in the small region 110 at the position 110α. L3 indicates the principal ray of the light flux that passes through the third reference exit pupil EP3 and is incident on the AF pixel in the small region 110 at the position 110α.

In FIG. 8, assuming that θ1 is the angle of incidence of the principal ray L1 to the AF pixel, the deviation amount in the first AF pixel pair in the small region 110 at the image height Hd is determined based on the angle of incidence θ1. Similarly, assuming that θ2 and θ3 respectively are the angles of incidence of the principal rays L2 and L3 to the AF pixels, the deviation amounts in the second and third AF pixel pairs in the small region 110 at the image height Hd are determined based on the angles of incidence θ2 and θ3, respectively. As described above, the deviation amount increases as the incident angle increases. Further, except for the position where the image height is 0 (position 0), the longer the exit pupil distance, the smaller the incident angle, so that θ1<θ2<θ3. Therefore, in the first, second, and third AF pixel pairs shown in FIGS. 6(a) through 6(c), the deviation amounts d1, d2, and d3 are as d1<d2<d3. Further, in the first, second, and third AF pixel pairs shown in FIGS. 7(a) through 7(c), the deviation amounts d4, d5, and d6 are as d4<d5<d6.

In such a way, the deviation amount of the first AF pixel pair with respect to the first reference exit pupil EP1 (the first reference exit pupil distance Po1) is determined. Similarly, the deviation amount of the second AF pixel pair with respect to the second reference exit pupil EP2 (the second reference exit pupil distance Po2) and the deviation amount of the third AF pixel pair with respect to the third reference exit pupil EP3 (the third reference exit pupil distance Po3) are determined.

Next, the relationship between the exit pupil distance of the photographing optical system 31 and the first to third AF pixel pairs will be described. As shown in FIG. 8, a first threshold value Th1 regarding the exit pupil distance is set at an intermediate position between the first reference exit pupil EP1 and the second reference exit pupil EP2, and a second threshold value Th2 regarding the exit pupil distance is set at an intermediate position between the second reference exit pupil EP2 and the third reference exit pupil EP3. The region where the exit pupil distance is equal to or greater than the first threshold Th1 is defined as a first exit pupil distance range R1, the region where the exit pupil distance is between the first threshold Th1 and the second threshold Th2 is defined as a second exit pupil distance range R2, and the region where the exit pupil distance is equal to or less than the second threshold Th2 is defined as a third exit pupil distance range R3.

In a case that the exit pupil distance of the photographing optical system 31 is equal to or greater than the first threshold Th1, that is, in a case that the exit pupil distance of the photographing optical system 31 belongs to the first exit pupil distance range R1, the pixel selection unit 213 selects the first AF pixel pair. In a case that the exit pupil distance of the photographing optical system 31 is between the first threshold Th1 and the second threshold Th2, that is, in a case that the exit pupil distance of the photographing optical system 31 belongs to the second exit pupil distance range R2, the pixel selection unit 213 selects the second AF pixel pair. In a case that the exit pupil distance of the photographing optical system 31 is equal to or less than the second threshold Th2, that is, in a case that the exit pupil distance of the photographing optical system 31 belongs to the third exit pupil distance range R3, the pixel selection unit 213 selects the third AF pixel pair.

As described above, the pixel selection unit 213 selects an appropriate AF pixel pair from the first to third AF pixel pairs depending on, which the exit pupil distance of the photographing optical system belongs to among the first to third exit pupil distance ranges R1 to R3.

Figure 9:
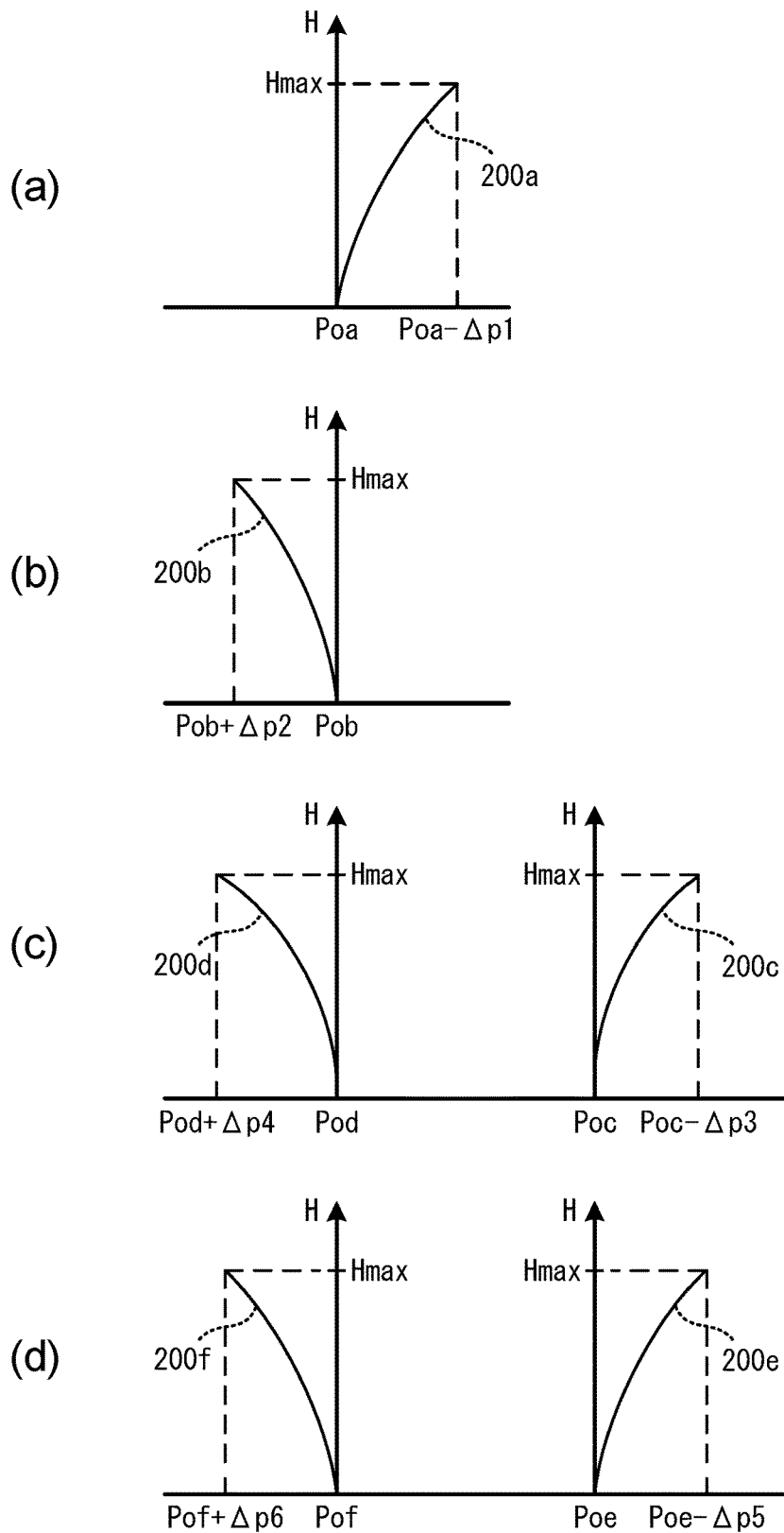
FIG. 9 shows various optical characteristics of an interchangeable lens whose exit pupil distance changes according to the image height, in the imaging device according to the first embodiment.

Next, the optical characteristics of the photographing optical system 31 of the interchangeable lens 3, specifically, the optical characteristics in which the exit pupil distance thereof changes depending on the image height will be described. FIG. 9 shows the optical characteristics of the interchangeable lens 3 to be mounted on the camera body 2 shown in FIG. 1 in which the exit pupil distance changes depending on the image height. In FIG. 9, the horizontal axis represents the exit pupil distance Po, and the vertical axis represents the image height H. FIG. 9(a), FIG. 9(b), FIG. 9(c), and FIG. 9(d) respectively show the optical characteristics of different types of interchangeable lenses. With respect to the optical characteristics of the photographing optical system 31 of the interchangeable lens 3, which is represented by the optical characteristic curve 200a in FIG. 9(a), the exit pupil distance Po decreases as the image height H increases. The optical characteristic curve 200a in FIG. 9(a) shows that, the exit pupil distance is Poa at image height zero, the exit pupil distance gradually decreases as the image height H increases, and the exit pupil distance becomes (Poa−Δp1) at the maximum image height Hmax.

With respect to the optical characteristics of the photographing optical system 31 of the interchangeable lens 3, which is represented by the optical characteristic curve 200b in FIG. 9(b), the exit pupil distance Po increases as the image height H increases. The optical characteristic curve 200b in FIG. 9(b) shows that, the exit pupil distance is Pob at image height zero, the exit pupil distance gradually increases as the image height H increases, and the exit pupil distance becomes (Pob+Δp2) at the maximum image height Hmax.

In the following description, an optical characteristic curve in which the exit pupil distance Po decreases as the image height H increases, such as the optical characteristic curve 200a, is referred to as a negative optical characteristic curve. On the other hand, an optical characteristic curve in which the exit pupil distance Po increases as the image height H increases, such as the optical characteristic curve 200b, is referred to as a positive optical characteristic curve.

The photographing optical system 31 of the interchangeable lens 3 shown in FIG. 9(c) has an optical characteristic curve that differs, that is, changes depending on the position of the focusing lens 31b shown in FIG. 1. This photographing optical system 31 exhibits an optical characteristic curve 200c when the focusing lens 31b is located at a first position and exhibits an optical characteristic curve 200d when the focusing lens 31b is located at a second position. The first and second positions of the focusing lens 31b are arbitrary positions between the infinity position and the closest position, of the focusing lens 31b, including the infinity position and the closest position. The infinity position of the focusing lens 31b is a position where the subject at the infinity distance is in focus, and the closest position is a position where the subject at the closest distance is in focus.

In FIG. 9(c), the optical characteristic curve 200c represents the optical characteristics of the photographing optical system 31 in a case where the focusing lens 31b is at the first position. The optical characteristic curve 200c shows that, the exit pupil distance is Poc at image height zero, the exit pupil distance gradually decreases as the image height H increases, and the exit pupil distance becomes (Poc−Δp3) at the maximum image height Hmax. The optical characteristic curve 200d represents the optical characteristics of the photographing optical system 31 in a case where the focusing lens 31b is at the second position. The optical characteristic curve 200d shows that, the exit pupil distance is Pod at image height zero, the exit pupil distance gradually increases as the image height H increases, and the exit pupil distance becomes (Pod+Δp4) at the maximum image height Hmax.

In FIG. 9(c), the optical characteristic curve 200c in the case where the focusing lens 31b is at the first position is shown as the negative optical characteristic curve, and the optical characteristic curve 200d in the case where the focusing lens 31b is at the second position is shown as the positive optical characteristic curve. However, there can also be an interchangeable lens 3 having an optical characteristic in which both the optical characteristic curve 200c and the optical characteristic curve 200d are both positive or negative.

The photographing optical system 31 of the interchangeable lens 3 shown in FIG. 9(d) has an optical characteristic curve that differs, that is, changes depending on the focal length of the zoom lens (the position of the zoom lens 31a in FIG. 1). This photographing optical system 31 exhibits an optical characteristic curve 200e in a case where both the focal length is f1 and exhibits an optical characteristic curve 200f in a case where the focal length is f2.

In FIG. 9(d), the optical characteristic curve 200e represents the optical characteristics of the photographing optical system 31 in a case where the focal length is f1. The optical characteristic curve 200e shows that, the exit pupil distance is Poe at image height zero, the exit pupil distance gradually decreases as the image height H increases, and the exit pupil distance becomes (Poe−Δp5) at the maximum image height Hmax. The optical characteristic curve 200f represents the optical characteristics of the photographing optical system 31 in a case where the focal length is f2. The optical characteristic curve 200f shows that, the exit pupil distance is Pof at image height zero, the exit pupil distance gradually increases as the image height H increases, and the exit pupil distance becomes (Pof+Δp6) at the maximum image height Hmax.

In FIG. 9(d), the optical characteristic curve 200e in the case where the focal length is f1 is shown as the negative optical characteristic curve, and the optical characteristic curve 200f in the case where the focal length is f2 is shown as the positive optical characteristic curve. However, there can also be an interchangeable lens 3 having an optical characteristic in which both the optical characteristic curve 200e and the optical characteristic curve 200f are both positive or negative.

It is to be noted that the exit pupil distance Po at the image height H in the above description is the distance of the exit pupil of the photographing optical system 31 from view of the image height H of the imaging surface 22a. In other words, the exit pupil distance Po at the image height H is the exit pupil distance (distance from the imaging surface 22a) of the photographing optical system 31 through which the light flux that passes through the photographing optical system 31 and is incident on the position in correspondence with the image height H of the imaging surface 22a.

Figure 10:
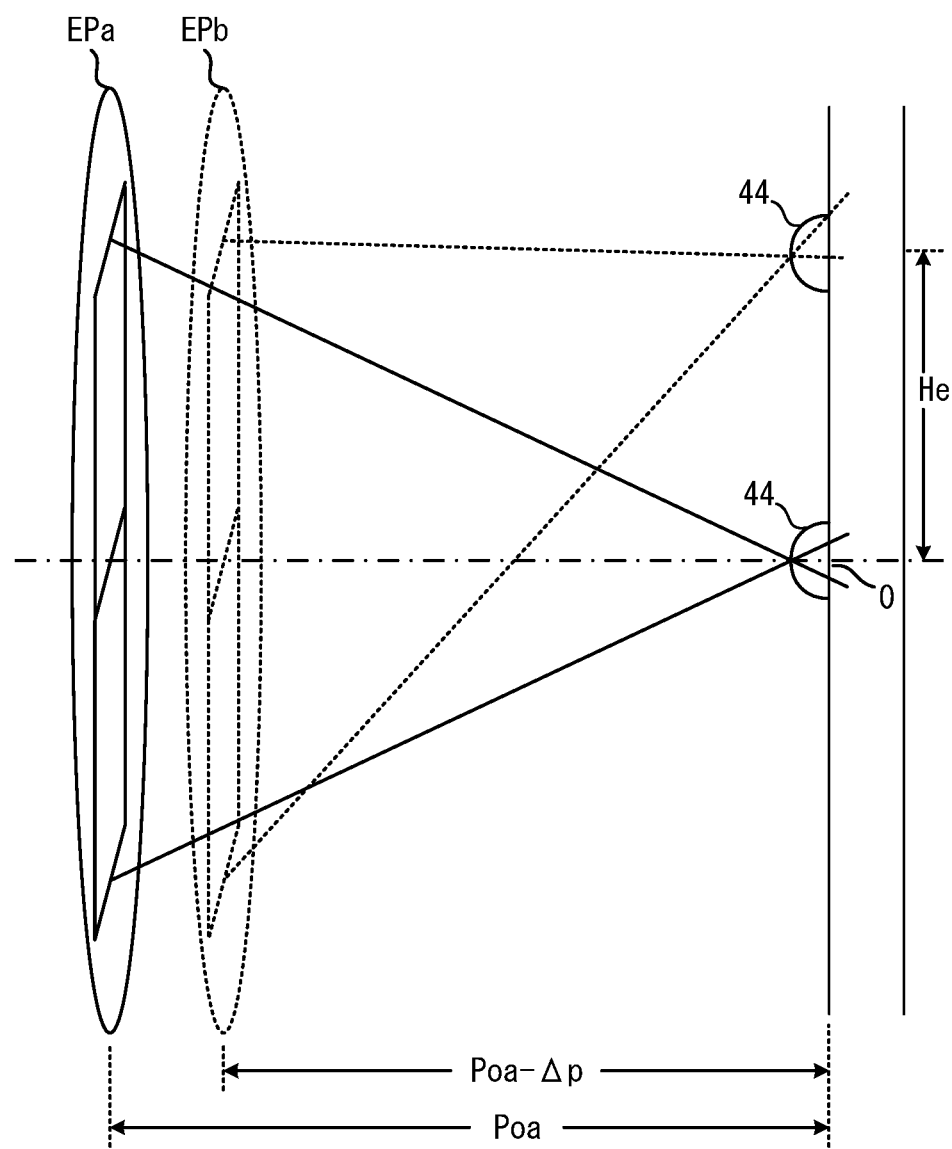
FIG. 10 is a diagram showing the relationship between the image height and the exit pupil in the imaging device according to the first embodiment.

FIG. 10 is a diagram showing the relationship between the image height H and the exit pupil distance Po. In FIG. 10, to the AF pixel (in FIG. 10, the microlens 44 is shown on behalf of the AF pixel) located at the center position 0 (image height zero) of the imaging surface 22a, the light flux that has passed through the exit pupil EPa (exit pupil distance Poa) of the imaging optical system 31 is incident. The exit pupil distance Poa of this exit pupil EPa is the exit pupil distance of the exit pupil EPa for the image height zero.

Further, a light flux that has passed through the exit pupil EPb of the photographing optical system 31 is incident on the AF pixel (in FIG. 10, the microlens 44 is shown as representative of the AF pixel) located at the image height He. The exit pupil distance (Poa−Δp) of the exit pupil EPb is the exit pupil distance of the exit pupil EPb for the image height H.

Here, the relationship between the optical characteristics of each interchangeable lens 3 and the above formula (1) will be described. Po (H)=h4×H⁴+h2×H²+Co of the above formula (1) is a function to approximate the optical characteristic curves 200a, 200b, 200c, 200d, 200e, 200f and the like shown in FIG. 9(a) through FIG. 9(d). The optical characteristic curve 200a shown in FIG. 9(a) is approximated by the calculation of the formula (1); by setting the constant term Co to the exit pupil distance Poa at the image height zero of FIG. 9(a), and by setting the coefficients h4 and h2 to the coefficients h4a and h2a corresponding to the curve of the optical characteristic curve 200a. As described above, the interchangeable lens 3 having the optical characteristics of FIG. 9(a) stores the constant term Poa and the coefficients h4a and h2a in the lens memory 33 as lens information.

Similarly, with respect to the interchangeable lens 3 having the optical characteristics of FIG. 9(b), the constant terms Pob and the coefficients h4b and h2b, that determines a calculation of the formula (1) that approximates the optical characteristics curve 200b are stored in the lens memory 33 as the lens information.

Further, the interchangeable lens 3 shown in FIG. 9(c) has optical characteristics in which the optical characteristic curve changes depending on the position of the focusing lens 31b. The interchangeable lens 3 stores in the lens memory 33 the constant terms Co and the coefficients h4 and h2 for the calculation of the formula (1) that approximate the optical characteristic curve for each position of the focusing lens 31b. The range in which the focusing lens 31b moves (between the infinity position and the closest position) is divided into a plurality of zones Z1 to Zn, and one optical characteristic curve representing the zone (range) is determined for each section Z1 to Zn. For example, the optical characteristic curve in a case where the focusing lens 31b is located at the intermediate position of one zone is defined as the optical characteristic curve representing that zone.

The optical characteristic curve representing the zone Zk is defined as the optical characteristic curve Zk (k=1, 2, . . . n). For the calculation of the formula (1) that approximates the optical characteristic curve Z1 representing the zone Z1, the constant term Co and the coefficients h4 and h2 are set to Poz1, h4z1 and h2z1. For the calculation of the formula (1) that approximates the optical characteristic curve Z2 representing the zone Z2, the constant term Co and the coefficients h4 and h2 are set to Poz2, h4z2 and h2z2. Similarly, for the calculation of the formula (1) that approximates the optical characteristic curve Zn representing the zone Zn, the constant term Co and the coefficients h4 and h2 are set to Pozn, h4zn and h2zn. FIG. 11 shows these zones and the constant terms and coefficients for the calculation for approximating the optical characteristic curves representing these zones. The interchangeable lens 3 stores the zones Z1 to Zn, the constant terms Poz1 to Pozn, and the coefficients h4z1 to h4zn and h2z1 to h2zn shown in FIG. 11 in the lens memory 33, as lens information.

The interchangeable lens 3 shown in FIG. 9(d) is a zoom lens and has optical characteristics in which the optical characteristic curve changes depending on the focal length. The interchangeable lens 3 stores in the lens memory 33 the constant terms Co and the coefficients h4 and h2 for the calculation of the formula (1) that approximate the optical characteristic curve for each focal length. The distance between the maximum focal length and the minimum focal length of the zoom lens set by the zoom lens 31a shown in FIG. 1 is divided into a plurality of zones W1 to Wn, and one optical characteristic curve representing the zone is determined for each zone W1 to Wn. For example, an optical characteristic curve at a focal length in the middle of one zone is defined as an optical characteristic curve representing that zone.

The optical characteristic curve representing the zone Wk is defined as the optical characteristic curve Wk (k=1, 2, . . . n). For the calculation of the formula (1) that approximates the optical characteristic curve W1 representing the zone W1, the constant term Co and the coefficients h4 and h2 are set to Pow1, h4w1 and h2w1. For the calculation of the formula (1) that approximates the optical characteristic curve W2 representing the zone W2, the constant term Co and the coefficients h4 and h2 are set to Pow2, h4w2 and h2w2. Similarly, for the calculation of the formula (1) that approximates the optical characteristic curve Wn representing the zone Wn, the constant term Co and the coefficients h4 and h2 are set to Pown, h4wn and h2wn. FIG. 12 shows these zones and the constant terms and coefficients for the calculation for approximating the optical characteristic curves representing these zones. The interchangeable lens 3 stores the zones W1 to Wn, the constant terms Pow1 to Pown, the coefficients h4w1 to h4wn, and h2w1 to h2wn in the lens memory 33 shown in FIG. 12, as lens information.

Although the interchangeable lens 3 of FIG. 9(d) is a zoom lens having optical characteristics in which the optical characteristic curve changes depending on the focal length, there is another zoom lens having optical characteristics in which the optical characteristic curve changes depending on the position of the focusing lens 31b in addition that the optical characteristic curve changes depending on the focal length. That is, the optical characteristic curve of the another zoom lens changes depending on both the position (focal length) of the zoom lens 31a and the position of the focusing lens 31b.

Figure 13:
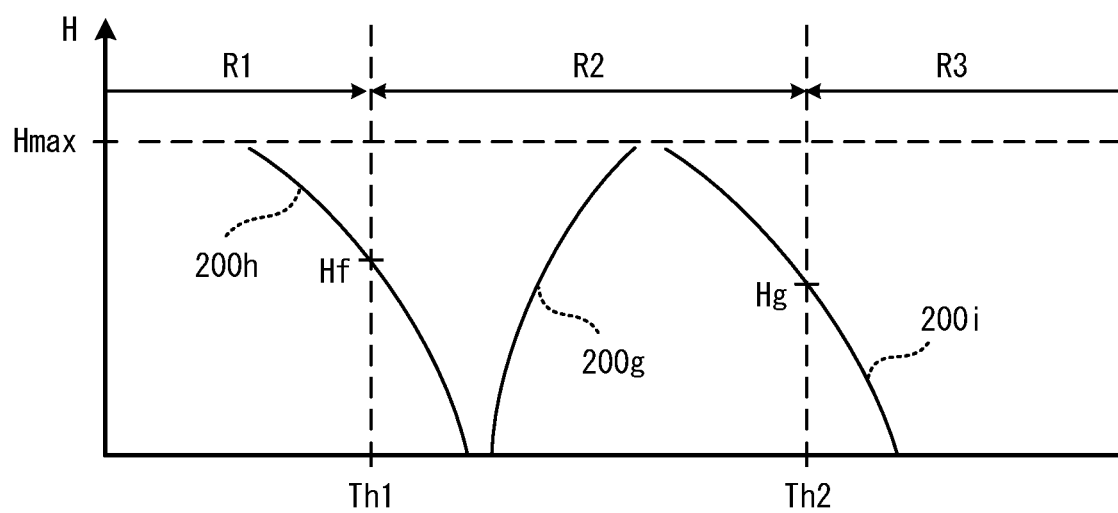
FIG. 13 is a diagram showing, in the imaging device according to the first embodiment, a threshold value of an exit pupil distance, first to third exit pupil distance ranges, and an optical characteristic curve.

Next, the relationship between the optical characteristic curve showing the optical characteristics of the interchangeable lens 3 shown in FIG. 9 and the first to third exit pupil distance ranges R1 to R3 shown in FIG. 8 will be described. FIG. 13 shows; the first and second threshold values Th1 and Th2 regarding the exit pupil distance shown in FIG. 8, the first to third exit pupil distance ranges R1 to R3, and the optical characteristic curve exemplified in FIG. 9. As shown in FIG. 13, in the entire optical characteristic curve 200g, that is, the exit pupil distance from the image height zero to the maximum image height Hmax is located within the second exit pupil distance range R2. In a case where the interchangeable lens 3 having such an optical characteristic curve 200g is attached to the camera body 2, even if the region setting unit 211 set the focus detection area 100 for any image height H, the pixel selection unit 213 selects the second AF pixel pair.

With respect to the optical characteristic curve 200h, the part corresponding to the exit pupil distance from the image height zero to the image height Hf belongs to the second exit pupil distance range R2, and the part corresponding to the exit pupil distance from the image height Hf to the maximum image height Hmax belongs to the first exit pupil distance range R1. In a case where the area setting unit 211 sets the focus detection area 100 at which the image height is Hf or less, the pixel selection unit 213 selects the second AF pixel pair. Further, in a case where the area setting unit 211 sets the focus detection area 100 at which the image height is larger than Hf, the pixel selection unit 213 selects the first AF pixel pair.

With respect to the optical characteristic curve 200i, the part corresponding to the exit pupil distance from the image height zero to the image height Hg belongs to the third exit pupil distance range R3, and the part corresponding to the exit pupil distance from the image height Hg to the maximum image height Hmax belongs to the second exit pupil distance range R2. In a case where the area setting unit 211 sets the focus detection area 100 at which the image height is Hg or less, the pixel selection unit 213 selects the third AF pixel pair. Further, in a case where the area setting unit 211 sets the focus detection area 100 at which the image height is larger than Hg, the pixel selection unit 213 selects the second AF pixel pair.

It is to be noted, as described above, in a case where a plurality of focus detection areas 100 are set by the area setting unit 211, the pixel selection unit 213 selects the same type of AF pixel pairs for all selected focus detection area 100. In such case, the pixel selection unit 213 selects an AF pixel pair based on the position of the focus detection area 100 farthest from the optical axis OA1 of the photographing optical system 31 (the image height H is the highest) among the plurality of selected focus detection areas 100. In the present embodiment, the pixel selection unit 213 selects AF pixel pairs as described above based on the image height of the focus detection area 100 having the highest image height among the plurality of selected focus detection areas 100. The pixel selection unit 213 selects AF pixel pairs of the same type as the selected AF pixel pair for the focus detection area 100 of the highest image height among the selected plurality of focus detection areas 100 with respect also to other focus detection areas 100.

Figure 14:
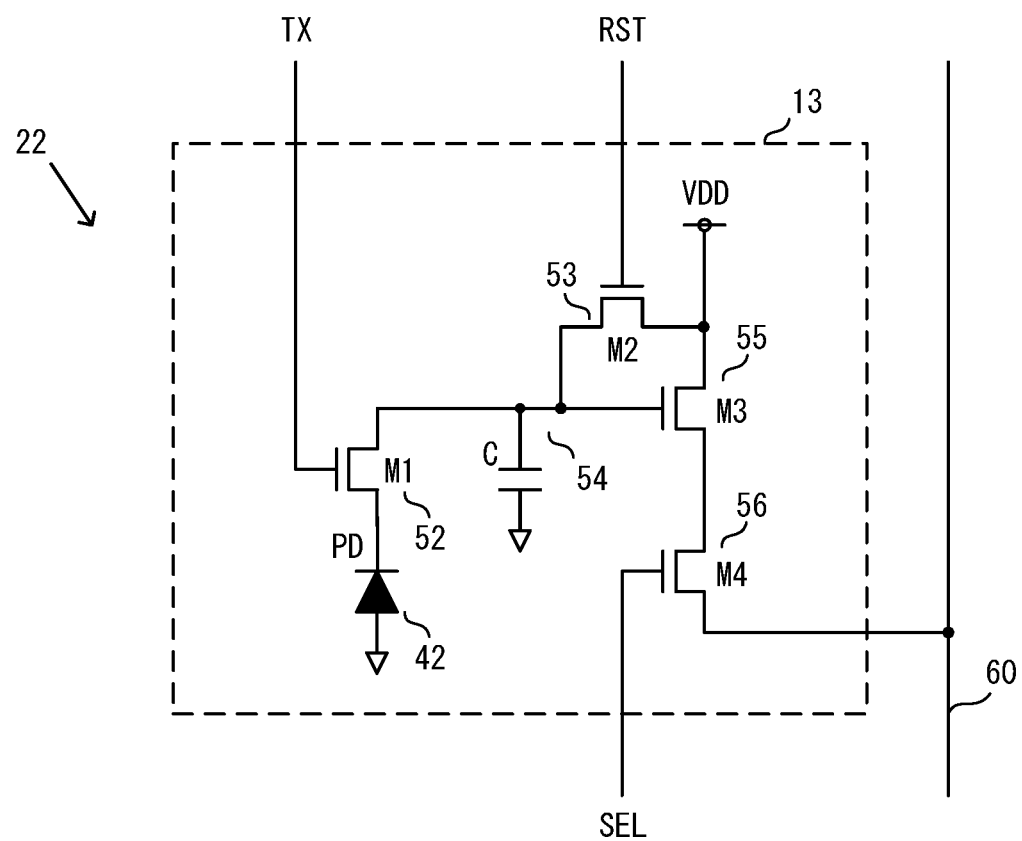
FIG. 14 is a diagram showing a circuit configuration of the pixel of an image sensor according to the first embodiment.

The circuit configuration and operation of the image sensor 22 according to the first embodiment will be described with reference to FIG. 14 and FIG. 15. FIG. 14 is a diagram showing a configuration of a pixel of the image sensor 22 according to the first embodiment. The pixel 13 includes the photoelectric conversion unit 42, a transfer unit 52, a reset unit 53, a floating diffusion (FD) 54, an amplification unit 55, and a selection unit 56. The photoelectric conversion unit 42 is a photodiode PD, which converts incident light into electric charge and stores the photoelectrically converted electric charges.

The transfer unit 52 is configured with a transistor M1 controlled by a signal TX, and transfers the charge photoelectrically converted by the photoelectric conversion unit 42 to the FD 54. The transistor M1 is a transfer transistor. A capacitor C of the FD 54 accumulates (retains) the charge transferred to the FD 54.

The amplification unit 55 outputs a signal corresponding to the electric charge stored in the capacitor C of the FD 54. The amplification unit 55 and the selection unit 56 configure an output unit that generates and outputs a signal based on the electric charge generated by the photoelectric conversion unit 42.

The reset unit 53 is configured with a transistor M2 controlled by a signal RST, discharges the electric charge accumulated in the FD 54, and resets the voltage of the FD 54. The transistor M2 is a reset transistor.

The selection unit 56 is configured with a transistor M4 controlled by a signal SEL, and electrically connects or disconnects the amplification unit 55 and a vertical signal line 60. The transistor M4 is a selection transistor.

As described above, the charge photoelectrically converted by the photoelectric conversion unit 42 is transferred to the FD 54 by the transfer unit 52. Then, a signal corresponding to the electric charge transferred to the FD 54 is output to the vertical signal line 60. A pixel signal is an analog signal generated based on the electric charge photoelectrically converted by the photoelectric conversion unit 42. The signal output from the imaging pixel 13 is converted into a digital signal and then output to the body control unit 210.

It is to be noted, in the present embodiment, the circuit configurations of the first AF pixels 11 (11*a* to 11*c*) and the second AF pixels 12 (12*a* to 12*c*) are the same as the circuit configuration of the imaging pixel 13. The signals output from the first AF pixel 11 and the second AF pixel 12 are converted into digital signals and then output to the body control unit 210 as the pair of signals (the first and second signals Sig1 and Sig2) used for focus detection.

Figure 15:
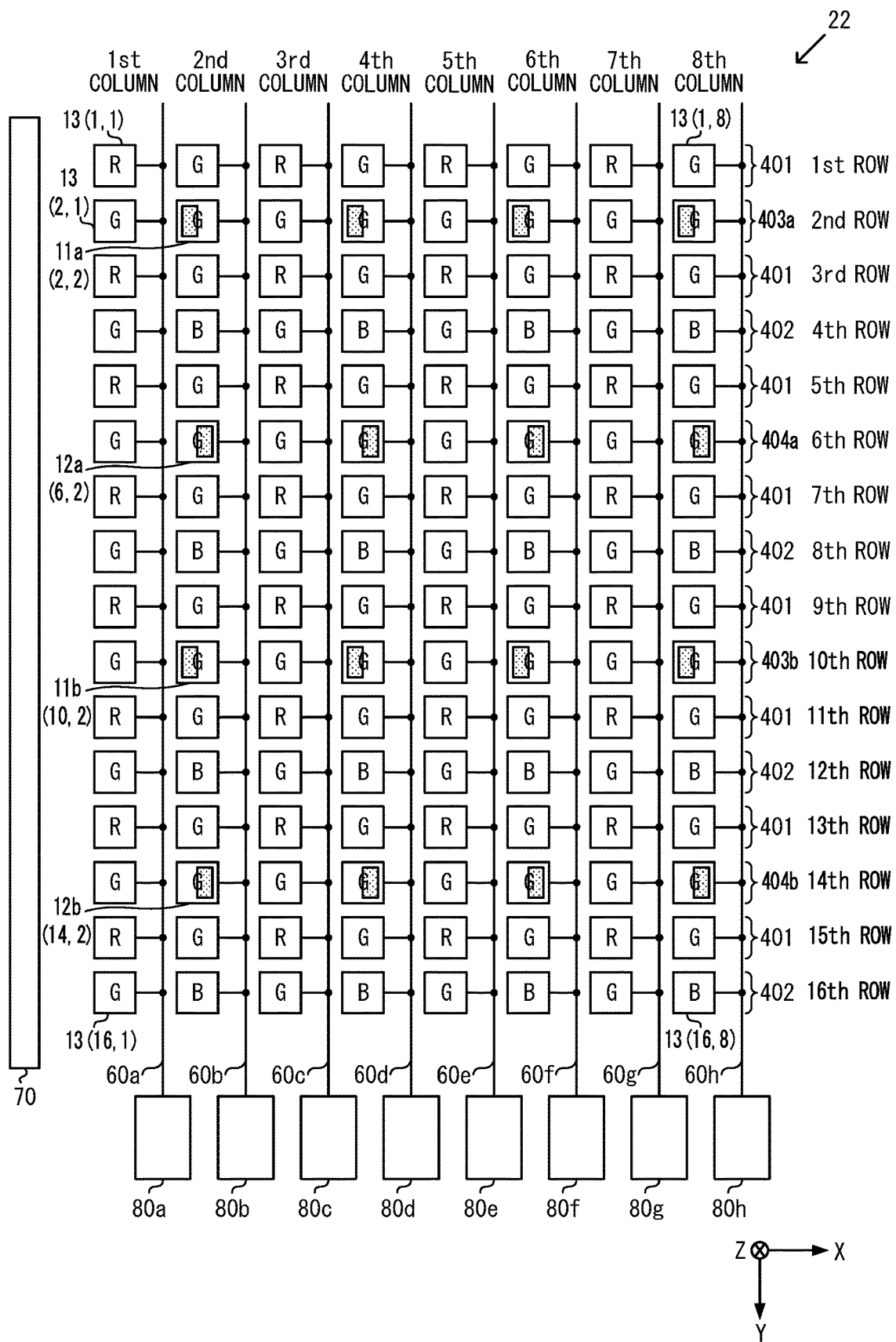
FIG. 15 is a diagram showing a configuration of part of the image sensor according to the first embodiment.

FIG. 15 is a diagram showing a configuration example of the image sensor according to the first embodiment. The image sensor 22 includes a plurality of imaging pixels 13, a first AF pixel 11 and a second AF pixel 12, a vertical control unit 70, and a plurality of column circuit units 80. It is to be noted, in FIG. 15, for simplification of the description, only 128 pixels of 8 pixels in the row direction (±X direction)×16 pixels in the column direction (±Y direction) are shown. In FIG. 15, the pixel in the upper left corner is defined as the imaging pixel 13 (1,1) in the 1st row and the 1st column, and the imaging pixel in the lower right corner is defined as the imaging pixel 13 (16, 8) in the 16th row and the 8th column. The image sensor 22 is provided with a plurality of vertical signal lines 60 (vertical signal lines 60*a* to 60*h*). The plurality of vertical signal lines 60 are connected to each of the pixel columns (1st column to 8th column), which is a column of a plurality of pixels arranged in the column direction, that is, in the vertical direction. To each of the vertical signal lines 60*a*, 60*c*, 60*e*, 60*g*, a plurality of imaging pixels 13 arranged in each of columns are connected, and the vertical signal lines 60*a*, 60*c*, 60*e*, 60*g* respectively output signals of the connected imaging pixels 13. To each of the vertical signal lines 60*b*, 60*d*, 60*f*, 60*h*, a plurality of imaging pixels 13, a plurality of the first AF pixels and a plurality of the second AF pixels arranged in each of columns are connected, and the vertical signal lines 60*b*, 60*d*, 60*f*, 60*h* respectively output signals of the connected imaging pixels 13, the first AF pixels and the second AF pixels.

The vertical control unit 70 is provided so as to be common to a plurality of pixel columns. The vertical control unit 70 supplies the signal TX, the signal RST, and the signal SEL shown in FIG. 14 to each pixel to control the operation of each pixel. The vertical control unit 70 supplies a signal to the gate of each transistor of the pixel, and turns the transistor on (connected state, conducting state, short-circuited state) or off state (disconnected state, non-conducting state, open state, break-circuit state).

The column circuit unit 80 includes an analog/digital conversion unit (AD conversion unit), and converts an analog signal input from each pixel via the vertical signal line 60 into a digital signal and outputs the converted signal. The pixel signal converted into a digital signal is input to a signal processing unit (not shown), and after signal processing such as correlation double sampling and processing for correcting the signal amount, and output to the body control unit 210 of the camera 1.

The readout unit 214 of the camera 1, by controlling the vertical control unit 70, performs the first readout mode in which all pixel rows are sequentially selected and signal of each pixel is readout, and the second readout mode in which signals from the AF pixel row and from the imaging pixel row are separately read out.

In a case the first readout mode has set by the readout unit 214, the vertical control unit 70 sequentially selecting pixel row and makes each pixel output signal. In FIG. 15, the vertical control unit 70 sequentially selects the imaging pixel rows 401, 402, the AF pixel rows 403*a*, 404*a*, 403*b*, and 404*b* from the 1st row toward the 16th row. Further, the vertical control unit 70 makes each pixel of the selected imaging pixel row or AF pixel row output signal to the vertical signal line 60. The readout unit 214 reads out the signal output to the vertical signal line 60. An example of a signal readout method in the first readout mode will be described below.

First, the vertical control unit 70 turns to on state the selection units 56 of the R pixel 13 (1,1) through the G pixel 13 (1,8), which are the pixels in the first imaging pixel row 401 of the 1st row. Further, the vertical control unit 70 makes the selection units 56 of pixels in the rows other than the 1st row turn to off state. Thereby, each signal of the R pixel 13 (1,1) through the G pixel 13 (1,8) in the 1st row is output, via the selection unit 56, to each of the signal lines 60*a* to 60*h* which are connected. The readout unit 214 reads out the signals of the R pixel 13 (1,1) through the G pixel 13 (1,8) having been output to the vertical signal lines 60.

Next, the vertical control unit 70 turns to on state the selection units 56 of the G pixel 13 (2,1) through the first AF pixel 11*a* (2,8), which are the pixels in the first AF pixel row 403*a* of the 2nd row. Further, the vertical control unit 70 makes the selection units 56 of pixels in the rows other than the 2nd row turn to off state. Thereby, each signal of the G pixel 13 (2,1) through the first AF pixel 11*a* (2,8) in the 2nd row is output to each of the signal lines 60*a* to 60*h*. The readout unit 214 reads out the signals of the G pixel 13 (2,1) through the first AF pixel 11*a* (2,8), in the 2nd row, having been output to the vertical signal lines 60.

Similarly, the vertical control unit 70 selects the 3rd and subsequent pixel rows (the first imaging pixel row 401, the second imaging pixel row 402, the first AF pixel row 403, the second AF pixel row 404) in the order of the 3rd row, the 4th row, the 5th row, and the 6th row. Further, the vertical control unit 70 makes each pixel of the selected imaging pixel row or AF pixel row output signal to the vertical signal line 60. The readout unit 214 reads out the signal output to the vertical signal line 60.

As described above, in the first readout mode, the readout unit 214 reads out a signal from each pixel of all the pixel rows. The signal having read out from each pixel is output to the body control unit 210 after being subjected to signal processing by the column circuit unit 80 or the like.

In a case the second readout mode is set by the readout unit 214, the vertical control unit 70 separately performs of outputting of the signal of each pixel in the AF pixel row to the vertical signal lines 60 and outputting of the signal of each pixel in the imaging pixel row to the vertical signal lines 60. In the present embodiment, the vertical control unit 70 first sequentially selects only the AF pixel row and let each pixel of the selected AF pixel row output a signal to the vertical signal lines 60. Then, the vertical control unit 70 sequentially selects the imaging pixel row and let each pixel of the selected imaging pixel row output a signal to the vertical signal lines 60. The readout unit 214 first reads out only the signal output to the vertical signal lines 60 from each pixel of the AF pixel row, and then reads out the signal output to the vertical signal lines 60 from each pixel of the imaging pixel row.

An example of a signal readout method in the second readout mode will be described below. It is to be noted, the vertical control unit 70 selects the AF pixel row in which the AF pixel pair selected by the pixel selection unit 213 is arranged, in one (or a plurality of) focus detection areas 100 set by the area setting unit 211. In the example shown below, it is assumed that the first AF pixel pair is selected by the pixel selection unit 213 based on the exit pupil distance of the photographing optical system 31.

First, the vertical control unit 70 turns to on state the selection units 56 of the G pixel 13 (2,1) through the first AF pixel 11*a* (2,8) which constitute the first AF pixel row 403*a* of the 2nd row shown in FIG. 15. Further, the vertical control unit 70 makes the selection units 56 of pixels in the rows other than the 2nd row turn to off state. Thereby, each signal of the G pixel 13 (2,1) through the first AF pixel 11*a* (2,8) is output, via the selection unit 56, to each of the signal lines 60*a* to 60*h* which are connected. The readout unit 214 reads out the signals of the G pixel 13 (2,1) through the first AF pixel 11*a* (2,8) having been output to the vertical signal lines 60.

Next, the vertical control unit 70 turns to on state the selection units 56 of the G pixels 13 (6,1) through the second AF pixel 12*a* (6,8) which constitute the second AF pixel row 404*a* of the 6th row shown in FIG. 15. Further, the vertical control unit 70 makes the selection units 56 of pixels in the rows other than the 6th row turn to off state. Thereby, each signal of the G pixel 13 (6,1) through the second AF pixel 12*a* (6,8) is output to each of the signal lines 60*a* to 60*h*. The readout unit 214 reads out the signals of the G pixel 13 (6,1) through the second AF pixel 12*a* (6,8) in the 2nd row, having output to the vertical signal lines 60.

Although not shown, a plurality of the first AF pixel rows 403*a* and a plurality of the second AF pixel rows 404*a* are also arranged in after the 16th row. The vertical control unit 70 sequentially selects only the plurality of the first AF pixel rows 403*a* and the plurality of the second AF pixel row 404*a* toward the column direction (+Y direction).

The vertical control unit 70 causes each pixel of the selected first AF pixel row 403*a* and the second AF pixel row 404*a* to output a signal to the vertical signal lines 60. The readout unit 214 reads out signals output to the vertical signal line 60 from the G pixels 13, the first AF pixels 11*a*, and the second AF pixels 12*a*. The signals sequentially read from each AF pixel row are output to the body control unit 210 after being subjected to signal processing by the column circuit unit 80 or the like.

After reading out the signal from each pixel of the AF pixel row, the vertical control unit 70 sequentially selects the imaging pixel row toward the column direction (+Y direction). The vertical control unit 70 causes each pixel of the selected imaging pixel row to output a signal to the vertical signal line 60. The readout unit 214 reads out signal output to the vertical signal line 60 from each pixel in the imaging pixel rows. The vertical control unit 70 turns to on state the selection units 56 of the R pixel 13 (1,1) through the G pixel 13 (1,8) which are in the first imaging pixel row 401 of the 1st row shown in FIG. 15. Further, the vertical control unit 70 makes the selection units 56 of pixels in the rows other than the 1st row turn to off state. Thereby, each signal of the R pixel 13 (1,1) through the G pixel 13 (1,8) is output to each of the signal lines 60*a* to 60*h*. The readout unit 214 reads out the signals of the R pixel 13 (1,1) through the G pixel 13 (1,8) having been output to the vertical signal lines 60.

Next, the vertical control unit 70 turns to on state the selection units 56 of the R pixel 13 (3,1) through the G pixel 13 (3,8) which constitute the first imaging pixel row 401 of the 3rd row shown in FIG. 15. Further, the vertical control unit 70 makes the selection units 56 of pixels in the rows other than the 3rd row turn to off state. Thereby, each signal of the R pixel 13 (3,1) through the G pixel 13 (3,8) is output to each of the signal lines 60*a* to 60*h*. The readout unit 214 reads out the signals of the R pixel 13 (3,1) through the G pixel 13 (3,8) having been output to the vertical signal lines 60.

Further, the vertical control unit 70 turns to on state the selection units 56 of the G pixel 13 (4,1) through the B pixel 13 (4,8) which constitute the first imaging pixel row 402 of the 4th row shown in FIG. 15. Further, the vertical control unit 70 makes the selection units 56 of pixels in the rows other than the 4th row turn to off state. Thereby, each signal of the G pixel 13 (4,1) through the B pixel 13 (4,8) is output to each of the signal lines 60*a* to 60*h*. The readout unit 214 reads out the signals of the G pixel 13 (4,1) through the B pixel 13 (4,8) having been output to the vertical signal lines 60.

Similarly, with respect to the 5th row and subsequent rows, the vertical control unit 70 sequentially selects the imaging pixel rows (first imaging pixel row 401, second imaging pixel row 402). The vertical control unit 70 makes each pixel of the selected the first imaging pixel row 401 and the second imaging pixel row 402 output signal to the vertical signal line 60. The readout unit 214 reads the signals output from the R pixel 13, the G pixel 13, and the B pixel 13 to the vertical signal line 60. The signals sequentially read from each imaging pixel row are output to the body control unit 210 after being subjected to signal processing by the column circuit unit 80 or the like.

As described above, in the second readout mode, the readout unit 214 controls the vertical control unit 70 to read out a signal from each pixel in the AF pixel row prior to read out a signal from each pixel in the imaging pixel row. Therefore, the first and second signals Sig1 and Sig2 of the AF pixel pair can be read out at high speed, and the time required for focus adjustment can be shortened. Further, since the reading unit 214 reads out the signal of each pixel of the AF pixel row and the signal of each pixel of the imaging pixel row separately, the signal used for the focus detection can be efficiently obtained, and the load for processing signals for AF can be reduced. The camera 1 according to the present embodiment reads out the first and second signals Sig1 and Sig2 of the AF pixel pair selected based on the exit pupil distance of the photographing optical system 31 and performs the focus detection process. Thus, highly accurate focus detection can be performed.

It is to be noted, in a case the second readout mode is set, the readout unit 214 may read out a signal from each pixel of the imaging pixel row prior to read out a signal from each pixel in the AF pixel row. Even in such a case, since the signal of the AF pixel pair selected based on the exit pupil distance of the photographing optical system 31 is read out and the focus detection process is performed, the focus detection can be performed with high accuracy. Further, since the readout unit 214 reads out the signal of each pixel of the AF pixel row and the signal of each pixel of the imaging pixel row separately, the load for processing signals for AF can be reduced.

Moreover, the readout unit 214, in a case reading out signals from each pixel in the imaging pixel row (the first imaging pixel row 401, the second imaging pixel row 402) in the second readout mode, may read out signals by performing thinning out readout in which pixels of specific row or column are thinned. In a case performing the thinning out reading, the reading unit 214 selects imaging pixels in a specific row or column among all the imaging pixels and reads out a signal from the selected imaging pixel. By controlling the vertical control unit 70, since the readout unit 214 skips reading the signal of the pixel of a specific row or column, the signal can be read out at high speed. In this case, the signals from the AF pixel row can be read out before reading out the signals from the imaging pixel row in the second read mode, and the signals from the imaging pixel row can be read out at high speed. Therefore, in a case displaying a live view image or shooting a moving image, by performing in the second readout mode, it is possible to perform high-speed focus detection and high-speed shooting. It is to be noted, the readout unit 214 may read out signals from a plurality of imaging pixels through adding the signals.

According to the above-described embodiment, the following effects can be obtained.

(1) The focus detection device, comprises: the imaging unit (the image sensor 22) having the first pixel and the second pixel (the AF pixels) each of which receives light transmitted through the optical system and outputs signal used for focus detection, and the third pixel (the imaging pixel) which receives light transmitted through the optical system and outputs signal used for image generation; the input unit (the body control unit 210) to which the information regarding the optical system is input; the selection unit (the image selection unit 213) that selects at least one of the first pixel and the second pixel based on the information input to the input unit; the readout unit (the readout unit 214) that reads out the signal from at least one of the first pixel and the second pixel based on a selection result of the selection unit at a timing different from the timing of reading out the signal from the third pixel to be read out; and the focus detection unit 215 that performs the focus detection based on at least one of the signals of the first pixel and the second pixel which read out by the readout unit. In the present embodiment, the readout unit 214 reads a signal from each pixel in the AF pixel row prior to read out a signal from each pixel in the imaging pixel row. Therefore, the focus detection device can read out the signals of the AF pixel pair at high speed, and can perform focus adjustment at high speed. Moreover, since the readout unit 214 reads out the signal of each pixel of the AF pixel row and the signal of each pixel of the imaging pixel row separately, the load for processing signals for AF can be reduced. Further, the focus detection unit 215 performs the focus detection process using the signal output from the AF pixel pair selected based on the exit pupil distance of the photographing optical system 31. Therefore, highly accurate focus detection can be performed.

The following variations are also within the scope of the present invention, and one or more of the variations can be combined with the above-described embodiment.

Variation 1

In the first embodiment, although three reference exit pupils (the first to third exit pupils EP1 to EP3) were used as the reference exit pupils, it may be two reference exit pupils or four or more reference exit pupils.

Variation 2

The method of obtaining the exit pupil distance depending on the image height is not limited to the method of obtaining using the above-mentioned formula (1). For example, instead of the formula (1), a calculation formula using the cube of the image height can be used. Further, information (table) showing the relationship between the image height and the exit pupil distance may also be used without using the calculation formula.

Variation 3

In the first embodiment, an example in which information regarding the exit pupil distance is stored in advance in the lens memory 33 or the like and the information regarding the exit pupil distance is input from the interchangeable lens 3 to the camera body 2 has been described. However, the information regarding the exit pupil distance may be input to the camera body 2 from other than the interchangeable lens 3. For example, the body memory 23 may store the information regarding the exit pupil distance in advance, and the body control unit 210 may acquire the information regarding the exit pupil distance from the body memory 23. Further, the camera body 2 may acquire the information regarding the exit pupil distance from a storage medium or may acquire the information regarding the exit pupil distance from an external device by wired communication or wireless communication. It is to be noted, the information regarding the exit pupil distance may be information regarding the exit pupil distance corresponding to one image height.

Variation 4

In the first embodiment, the parameters (h4) and (h2) and the constant term Co, used for calculating the exit pupil distance Po (H) have been described as examples of the information regarding the exit pupil distance. However, the camera body 2 may acquire the value Po (H) itself of the exit pupil distance according to an image height, from the interchangeable lens 3, the storage medium, or the like as the information regarding the exit pupil distance.

Variation 5

Figure 16:
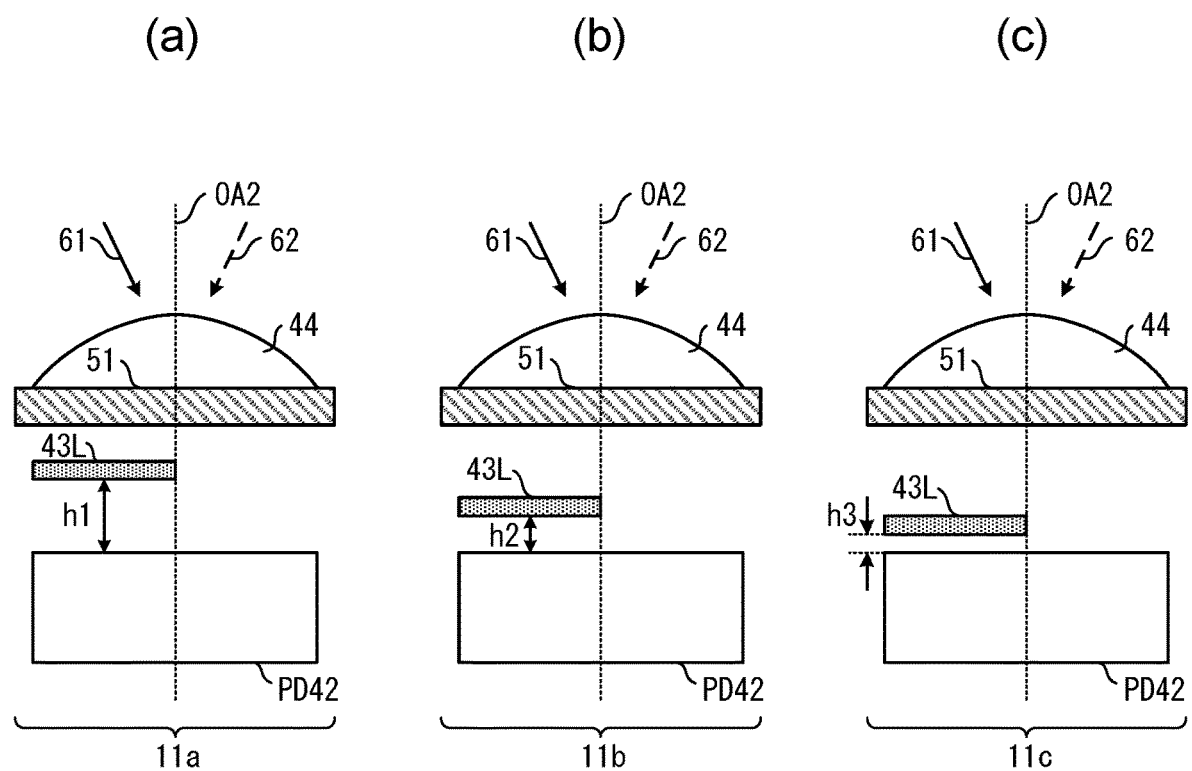
FIG. 16 is a diagram showing a configuration sample of an AF pixel of an image sensor according to a variation.

In the above-described embodiment, an example in which first to third AF pixel pairs having different deviation amounts are arranged on the image sensor 22 as a plurality of types of AF pixel pairs has been described. However, a plurality of types of AF pixel pairs having different arrangement positions of the light-shielding portions between the color filter 51 and the photoelectric conversion unit 42 may be arranged on the image sensor 22. FIG. 16 is a diagram showing a configuration example of a AF pixel of the image sensor 22 according to the present variation. In the figure, the same reference signs are assigned to the same or corresponding parts as those in the above-described embodiment.

The light-shielding portion 43L of the first AF pixel 11a is provided, between the color filter 51 and the photoelectric conversion unit 42, with a predetermined distance h1 from the photoelectric conversion unit 42. The light-shielding portion 43L of the first AF pixel 11b is provided, between the color filter 51 and the photoelectric conversion unit 42, with a predetermined distance h2 from the photoelectric conversion unit 42. The light-shielding portion 43L of the first AF pixel 11c is provided, between the color filter 51 and the photoelectric conversion unit 42, with a predetermined distance h3 from the photoelectric conversion unit 42. The distance h2 is smaller than the distance h1 and larger than the distance h3. That is, h1>h2>h3. As described above, arranged positions of the light-shielding portions 43L are different in the first AF pixels 11a, 11b, and 11c to each other. Further, in the second AF pixels 12a, 12b, 12c constituting each AF pixel pair, the arrangement positions of the light-shielding portions 43R are different from each other. Thereby, the first to third AF pixel pairs can perform pupil division corresponding to different incident angles, as in the case of the above-described embodiment.

Variation 6

In the first embodiment, an example in which one photoelectric conversion unit is arranged in one pixel has been described, however, a configuration in which two or more photoelectric conversion units are included per pixel may be adopted.

Variation 7

Figure 17:
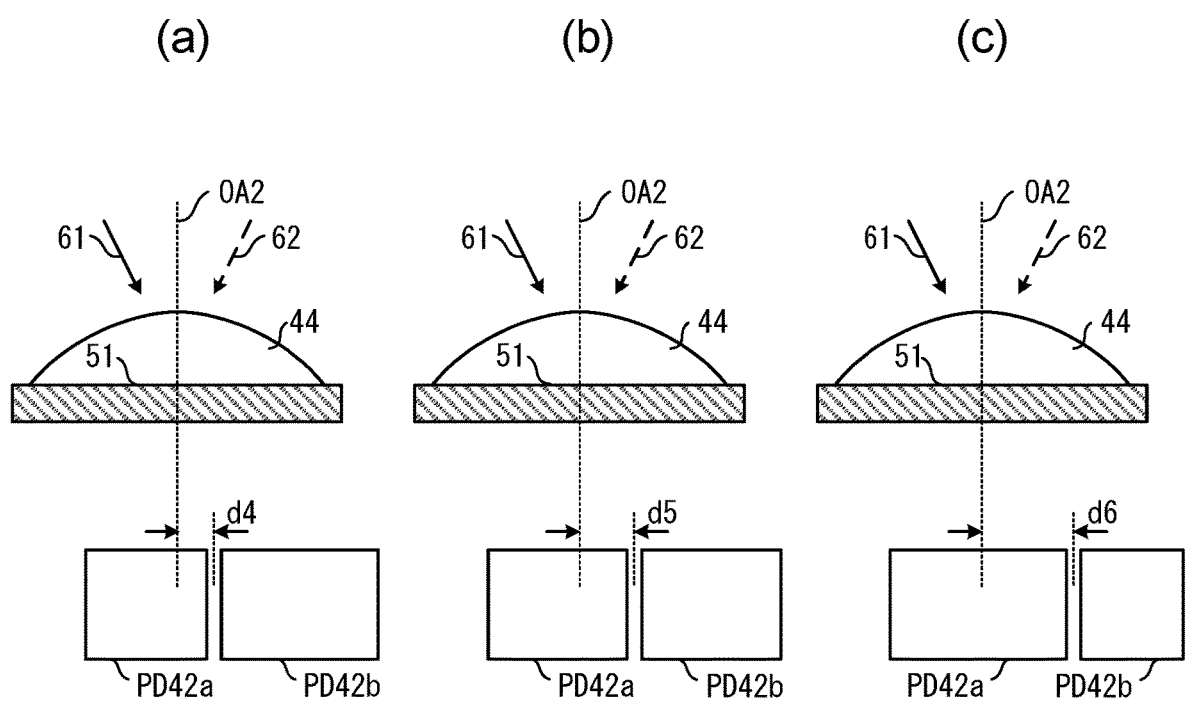
FIG. 17 is a diagram showing a configuration sample of an AF pixel of an image sensor according to a variation.

FIG. 17 is a diagram showing a configuration example of a AF pixel of the image sensor 22 according to the present variation. As an example, FIG. 17 shows a cross-sectional view of a part of three types of AF pixel pairs in the focus detection area 100c shown in FIG. 2. In the figure, the same reference signs are assigned to the same or corresponding parts as those in the above-described embodiment. Each of the three types of AF pixels shown in FIG. 17(a) to FIG. 17(c) includes a microlens 44, and a first and second photoelectric conversion units 42a and 42b each of which photoelectrically convert the light transmitted through the microlens 44. In the present variation, the light receiving areas, of a first photoelectric conversion units 42a and a second photoelectric conversion unit 42b are different from each other in the first to third AF pixel pair. In this case as well, the first to third AF pixel pairs can perform pupil division corresponding to different incident angles, as in the case of the above-described embodiment.

Variation 8

The pixel selection unit 213 may configure to select a plurality of types of AF pixel pairs. In this case, the focus detection unit 215 may calculate a plurality of defocus amounts from selected plurality of types of AF pixel pairs, and the movement amount of the focusing lens 31b may be calculated based on the average value of the defocus amounts. For example, the moving amount of the focusing lens 31b may be determined based on the average value of, the defocus amount calculated using the first and second signals Sig1 and Sig2 of the first AF pixel pair and the defocus amount calculated using the first and second signals Sig1 and Sig2 of the second AF pixel pair.

Variation 9

In the above-described embodiment, the case where the primary color system (RGB) color filter is used for the image sensor 22 has been described, but the complementary color system (CMY) color filter may be used.

Variation 10

The imaging device described in the above-described embodiment and variations may be applied to a camera, a smartphone, a tablet, a camera built in a PC, an in-vehicle camera, a camera mounted on an unmanned aerial vehicle (drone, radio-controlled model, etc.), etc.

Although various embodiments and variations have been described above, the present invention is not limited to these contents. Other aspects conceivable within the scope of the technical idea of the present invention are also included within the scope of the present invention.

The disclosure of the following priority application is herein incorporated by reference: Japanese Patent Application No. 2018-137274 filed Jul. 20, 2018.

REFERENCE SIGNS LIST

1 . . . Imaging Device, 2 . . . Camera Body, 3 . . . Interchangeable Lens, 11 . . . AF pixel, 12 . . . AF pixel, 13 . . . Imaging Pixel, 22 . . . Image Sensor, 31 . . . Photographing Optical System, 32 . . . Lens Control Unit, 42 . . . Photoelectric Conversion Unit, 210 . . . Body Control Unit, 211 . . . Area Setting Unit, 212 . . . Distance Calculation Unit, 213 . . . Pixel Selection Unit, 214 . . . Readout Unit, 215 . . . Focus Detection Unit, 216 . . . Image Data Generation Unit.

The invention claimed is:

1. An imaging device, comprising:
a first pixel and a second pixel each of which receives light transmitted through an optical system and outputs a signal used for focus detection;
a third pixel which receives light transmitted through the optical system and outputs a signal used for image generation;
a readout unit that reads out a signal of at least one of the first pixel and the second pixel, which is selected based on information on the optical signal, before reading out the signal of the third pixel; and
a signal line (i) that outputs the signal of at least one of the first pixel and the second pixel and the signal of the third pixel and (ii) that is provided in a first direction.

2. The imaging device according to claim 1, wherein:
the first pixel or the second pixel is selected based on the information;
the readout unit reads out the signal of the first pixel or the signal of the second pixel based on the selection at a different timing from reading out the signal of the third pixel; and
a focus detection unit of the imaging device performs focus detection based on the signal of the first pixel or the signal of the second pixel read out by the readout unit.

3. The imaging device according to claim 1, wherein the readout unit can switch between (i) a first readout in which at least one of the signal of the first pixel or the signal of the second pixel is read out before the signal of the third pixel is read out and (ii) a second readout in which, following reading of the signal of the first pixel, reading of the signal of the third pixel is performed and, following reading of the signal of the third pixel, reading of the signal of the second pixel is performed.

4. The imaging device according to claim 3, further comprising
an imaging unit provided with a plurality of the third pixels, wherein
the readout unit performs the first readout (i) when the signals of a part of the plurality of the third pixels are to be read out or (ii) when the signals of the plurality of the third pixels are to be added and read out, and
the readout unit performs the second readout when the signals of the plurality of the third pixels are to be read out.

5. The imaging device according to claim 1, wherein the third pixel is provided between the first pixel and the second pixel in the first direction.

6. The imaging device according to claim 1, wherein:
the imaging unit is provided with (i) a first pixel group provided in the first direction and in which a plurality of the first pixels are provided in a second direction intersecting the first direction and (ii) a second pixel group in which a plurality of the second pixels are provided in the second direction; and at least one of the first pixel group and the second pixel group is selected based on the information.

7. The imaging device according to claim 6, wherein:

the imaging unit has a third pixel group (i) provided between the first pixel group and the second pixel group and (ii) having a plurality of the third pixels provided in the second direction; and the readout unit reads out at least one of signals of the first pixel group and signals of the second pixel group at a timing different from reading out signals of the third pixel group.

8. The imaging device according to claim 7, wherein the readout unit reads out at least one of the signals of the first pixel group and the signals of the second pixel group before reading out the signals of the third pixel group.

9. The imaging device according to claim 1, further comprising an imaging unit provided with a plurality of focus detection areas each of which has the first pixel and the second pixel; and at least one of the first pixel and the second pixel is selected based on a position of the focus detection area and the information.

10. The imaging device according to claim 9, wherein at least one of the first pixel and the second pixel is selected in the plurality of focus detection areas.

11. The imaging device according to claim 9, wherein when the first pixel at one of the plurality of focus detection areas is selected, the first pixel at another of the plurality of focus detection areas is selected, and when the second pixel at one of the plurality of focus detection areas is selected, the second pixel at another of the plurality of focus detection areas is selected.

12. The imaging device according to claim 9, wherein at least one of the first pixel and the second pixel is selected based on the information and a position of a focus detection area farthest from an optical axis among the plurality of focus detection areas.

13. The imaging device according to claim 12, wherein:

when the first pixel is selected at the focus detection area farthest from the optical axis among the plurality of focus detection areas, the first pixel at another focus detection area is selected; and when the second pixel is selected at the focus detection area farthest from the optical axis among the plurality of focus detection areas, the second pixel at another focus detection area is selected.

14. The imaging device according to claim 9, wherein:

each of the plurality of focus detection areas has a first focus detection region and a second focus detection region that is farther from an optical axis than the first focus detection region; and at least one of the first pixel and the second pixel is selected based on a position of the second focus detection region and the information.

15. The imaging device according to claim 14, wherein:

when the first pixel is selected in the second focus detection region, the first pixel in the first focus detection region is selected; and when the second pixel is selected in the second focus detection region, the second pixel in the first focus detection region is selected.

16. The imaging device according to claim 9, further comprising:

a setting unit configured to set a focus detection area among the plurality of focus detection areas, wherein at least one of the first pixel and the second pixel is selected based on a position of the focus detection area set by the setting unit and the information.

17. The imaging device according to claim 1, wherein the information is information regarding an exit pupil distance of the optical system.

18. The imaging device according to claim 1, wherein the information is information regarding a position in an image plane and an exit pupil distance of the optical system.

19. The imaging device according to claim 1, further comprising an imaging unit provided with a plurality of the first pixels and a plurality of the second pixels;

each of the plurality of the first pixels includes a pixel that receives light having passed through a first pupil region of the optical system and a pixel that receives light having passed through a second pupil region, different from the first pupil region, of the optical system; and each of the plurality of the second pixels includes a pixel that receives light having passed through the first pupil region and a pixel that receives light having passed through the second pupil region.

20. The imaging device according to claim 1, wherein:

each of the first pixel and the second pixel has a photoelectric converter; and an area over which the photoelectric converter of the first pixel receives light is different from an area over which the photoelectric converter of the second pixel receives light.

21. The imaging device according to claim 1, further comprising a generator that generates image data based on signals output from at least one of the first pixel, the second pixel, and the third pixel.

22. An interchangeable lens comprising:

a detachable portion that enables to attach to and detach from the imaging device according to claim 1.

* * * * *